United States Patent
Kawaguchi et al.

(10) Patent No.: US 8,692,800 B2
(45) Date of Patent: Apr. 8, 2014

(54) COORDINATE DETECTION APPARATUS AND DISPLAY APPARATUS

(75) Inventors: Hiroto Kawaguchi, Miyagi (JP); Ryota Kitamura, Miyagi (JP)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 13/426,321

(22) Filed: Mar. 21, 2012

(65) Prior Publication Data
US 2012/0256872 A1  Oct. 11, 2012

(30) Foreign Application Priority Data
Apr. 6, 2011  (JP) .................. 2011-084534

(51) Int. Cl.
  *G06F 3/045* (2006.01)
  *G06F 3/041* (2006.01)
  *G06K 11/06* (2006.01)
  *G08C 21/00* (2006.01)

(52) U.S. Cl.
  USPC ........................................ 345/174; 178/18.01

(58) Field of Classification Search
  USPC .................... 345/173–178; 178/18.01–18.11
  See application file for complete search history.

(56) References Cited

U.S. PATENT DOCUMENTS

| | | | | |
|---|---|---|---|---|
| 6,297,811 B1* | 10/2001 | Kent et al. | ...................... | 345/173 |
| 8,477,106 B2* | 7/2013 | Salaverry et al. | ............. | 345/173 |
| 8,526,767 B2* | 9/2013 | Bowens | ........................ | 382/315 |
| 8,564,552 B2* | 10/2013 | Yilmaz | .......................... | 345/173 |
| 2009/0073135 A1* | 3/2009 | Lin et al. | ........................ | 345/173 |
| 2011/0193791 A1* | 8/2011 | Tong et al. | ..................... | 345/173 |
| 2012/0256873 A1* | 10/2012 | Herman | ........................ | 345/174 |

FOREIGN PATENT DOCUMENTS

JP  2008269297  11/2008

* cited by examiner

Primary Examiner — Kent Chang
Assistant Examiner — Nathan Brittingham
(74) Attorney, Agent, or Firm — K&L Gates LLP

(57) ABSTRACT

A coordinate detection apparatus includes: electrode arrays each including first/second/third electrodes extending in a first direction; and a processing unit. The first electrode includes first/second regions larger/smaller in dimension, with respect to the first direction, in parallel with a second direction orthogonal to the first direction. The second/third electrodes are smaller/larger in dimension, with respect to the first direction, in parallel with the second direction, and are opposed to the first/second regions in the second direction. The first/second/third electrodes are arranged in the second direction. Each electrode array outputs a capacitance value corresponding to a distance between it and a detection target. The processing unit calculates total sums (first/second/third values) of capacitance values of the respective first/second/third electrodes, and a sum of these total sums, and detects a position coordinate based on a different capacitance ratio depending on whether the second value is above or below the third value.

8 Claims, 19 Drawing Sheets

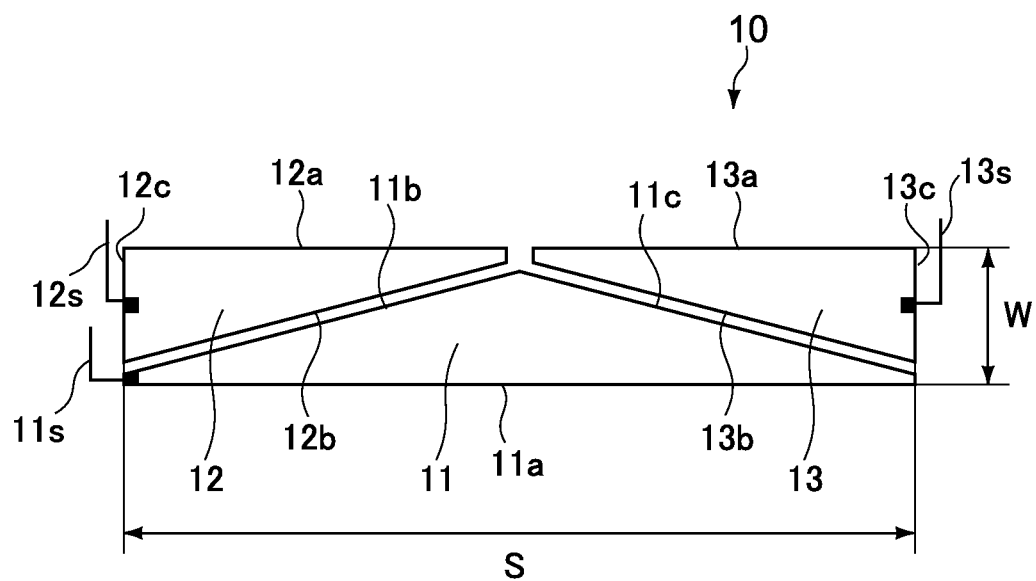
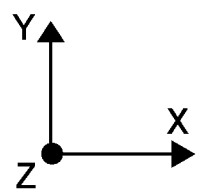
FIG.3

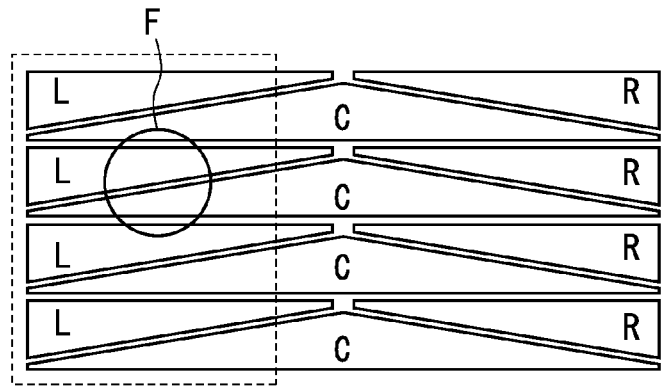
FIG.8A  $\Sigma L > \Sigma R$
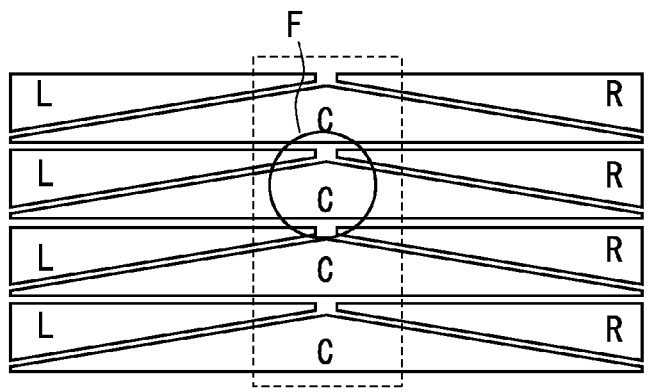
FIG.8B  $\Sigma L = \Sigma R$
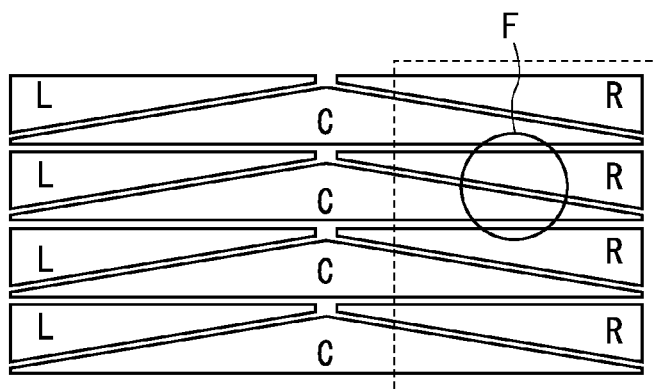
FIG.8C  $\Sigma L < \Sigma R$

COORDINATE DETECTION APPARATUS AND DISPLAY APPARATUS

CROSS REFERENCES TO RELATED APPLICATIONS

The present application claims priority to Japanese Priority Patent Application JP 2011-084534 filed in the Japan Patent Office on Apr. 6, 2011, the entire content of which is hereby incorporated by reference.

BACKGROUND

The present application relates to a coordinate detection apparatus and a display apparatus that detect a position coordinate of a detection target in accordance with changes in capacitance.

In recent years, there has been widespread usage of electronic apparatuses that detect a position of a finger in accordance with changes in capacitance and control screen display and apparatus operation. This kind of capacitance sensors generally determine an input position in accordance with contact or proximity of a finger in a flat plane by detecting changes in capacitance of a plurality of electrodes arranged in the flat plane.

For example, Japanese Patent Application Laid-open No. 2008-269297 (hereinafter, referred to as Patent Document 1) describes a coordinate input device including a pair of detection electrodes including one detection electrode and the other detection electrode that have the same outer shape. Each of the detection electrodes has an approximate right-angled triangular shape, which is flat. The detection electrodes are arranged such that the sides of the respective detection electrodes are opposed to each other, so that the width of the one detection electrode narrows toward a first direction and the width of the other detection electrode widens toward the first direction. A plurality of pairs of detection electrodes are arranged in a second direction orthogonal to the first direction, and the coordinate input device detects coordinates of an input position in accordance with changes in capacitance of the detection electrodes.

In particular, the coordinate input device is configured to calculate coordinates of an input position along the first direction in accordance with a ratio ($\Sigma CL/\Sigma CR$) of a total sum ($\Sigma CL$) of amounts of changes in capacitance of the one detection electrodes to a total sum ($\Sigma CR$) of amounts of changes in capacitance of the other detection electrodes.

SUMMARY

However, as described in Patent Document 1 above, in the method of detecting the coordinates of the input position in accordance with the ratio of the amounts of changes in capacitance of the one detection electrodes to the amounts of changes in capacitance of the other detection electrodes, a linearity of detected coordinate values with respect to the position of a finger along the first direction is not favorable, and thus it is difficult to correctly detect the coordinates.

In light of such circumstances, it is desirable to provide a coordinate detection apparatus and a display apparatus that are capable of improving coordinate detection performance.

According to an embodiment of the present application, there is provided a coordinate detection apparatus including a plurality of electrode arrays and a processing unit.

Each of the plurality of electrode arrays includes a first electrode, a second electrode, and a third electrode. The first electrode extends in a first direction and includes a first region that is gradually larger in dimension, with respect to the first direction, in parallel with a second direction orthogonal to the first direction, and a second region that is gradually smaller in dimension, with respect to the first direction, in parallel with the second direction. The second electrode extends in the first direction, is opposed to the first region in the second direction, and is gradually smaller in dimension, with respect to the first direction, in parallel with the second direction. The third electrode extends in the first direction, is opposed to the second region in the second direction, and is gradually larger in dimension, with respect to the first direction, in parallel with the second direction. Each of the plurality of electrode arrays includes a group of the first electrode, the second electrode, and the third electrode that are arranged in the second direction, and is configured to have a capacitance varied depending on proximity of a detection target.

The processing unit is configured to calculate a first value being a total sum of capacitance values of the first electrodes of the plurality of electrode arrays, a second value being a total sum of capacitance values of the second electrodes of the plurality of electrode arrays, a third value being a total sum of capacitance values of the third electrodes of the plurality of electrode arrays, and a fourth value being a sum of the first value, the second value, and the third value. The processing unit is further configured to detect, when the second value is larger than the third value, a first position coordinate in accordance with a first capacitance ratio being a ratio of a difference between the first value and the second value to the fourth value. The processing unit is further configured to detect, when the second value is smaller than the third value, the first position coordinate in accordance with a second capacitance ratio being a ratio of a difference between the third value and the first value to the fourth value.

In the above-mentioned coordinate detection apparatus, it is set that the first position coordinate is detected in accordance with the first capacitance ratio when the second value is larger than the third value and that the first position coordinate is detected in accordance with the second capacitance ratio when the second value is smaller than the third value. With this setting, a linearity of detected coordinate values along the first direction can be favorably obtained, and thus it is possible to improve detection accuracy for the first position coordinate.

According to another embodiment of the present application, there is provided a coordinate detection apparatus including a plurality of electrode arrays and a processing unit.

Each of the plurality of electrode arrays includes a first electrode and a second electrode. The first electrode extends in a first direction and is gradually larger in dimension, with respect to the first direction, in parallel with a second direction orthogonal to the first direction. The second electrode extends in the first direction, is opposed to the first electrode in the second direction, and is gradually smaller in dimension, with respect to the first direction, in parallel with the second direction. Each of the plurality of electrode arrays includes a pair of the first electrode and the second electrode that are arranged in the second direction, and is configured to have a capacitance varied depending on proximity of a detection target.

The processing unit is configured to calculate a first value being a total sum of capacitance values of the first electrodes of the plurality of electrode arrays, a second value being a total sum of capacitance values of the second electrodes of the plurality of electrode arrays, and a third value being a sum of the first value and the second value. The processing unit is further configured to detect a first position coordinate of the detection target along the first direction in accordance with a ratio of a difference between the first value and the second value to the third value.

In the above-mentioned coordinate detection apparatus, it is set that in accordance with the ratio of the difference between the first value and the second value to the third value, the first position coordinate of the detection target along the first direction is detected. With this setting, a linearity of detected coordinate values along the first direction can be favorably obtained, and thus it is possible to improve detection accuracy for the first position coordinate.

According to still another embodiment of the present application, there is provided a display apparatus including a plurality of electrode arrays, a display element, and a processing unit.

Each of the plurality of electrode arrays includes a first electrode, a second electrode, and a third electrode. The first electrode extends in a first direction and includes a first region that is gradually larger in dimension, with respect to the first direction, in parallel with a second direction orthogonal to the first direction, and a second region that is gradually smaller in dimension, with respect to the first direction, in parallel with the second direction. The second electrode extends in the first direction, is opposed to the first region in the second direction, and is gradually smaller in dimension, with respect to the first direction, in parallel with the second direction. The third electrode extends in the first direction, is opposed to the second region in the second direction, and is gradually larger in dimension, with respect to the first direction, in parallel with the second direction. Each of the plurality of electrode arrays includes a group of the first electrode, the second electrode, and the third electrode that are arranged in the second direction, and is configured to have a capacitance varied depending on proximity of a detection target.

The display element includes a display surface opposed to the plurality of electrode arrays.

The processing unit is configured to calculate a first value being a total sum of capacitance values of the first electrodes of the plurality of electrode arrays, a second value being a total sum of capacitance values of the second electrodes of the plurality of electrode arrays, a third value being a total sum of capacitance values of the third electrodes of the plurality of electrode arrays, and a fourth value being a sum of the first value, the second value, and the third value. The processing unit is further configured to detect, when the second value is larger than the third value, a first position coordinate in accordance with a first capacitance ratio being a ratio of a difference between the first value and the second value to the fourth value. The processing unit is further configured to detect, when the second value is smaller than the third value, the first position coordinate in accordance with a second capacitance ratio being a ratio of a difference between the third value and the first value to the fourth value.

According to the present application, it is possible to reduce an influence of the size of a detection target, to thereby improve detection accuracy for a position coordinate.

Additional features and advantages are described herein, and will be apparent from the following Detailed Description and the figures.

BRIEF DESCRIPTION OF THE FIGURES

FIG. 3 is a plane view of a configuration of an electrode array of the capacitance sensor;

FIG. 8 are plane views of electrode arrays for illustrating an example of operations on the coordinate detection apparatus;

DETAILED DESCRIPTION

Hereinafter, embodiments of the present application will be described with reference to the drawings.
<First Embodiment>

Figure 1:
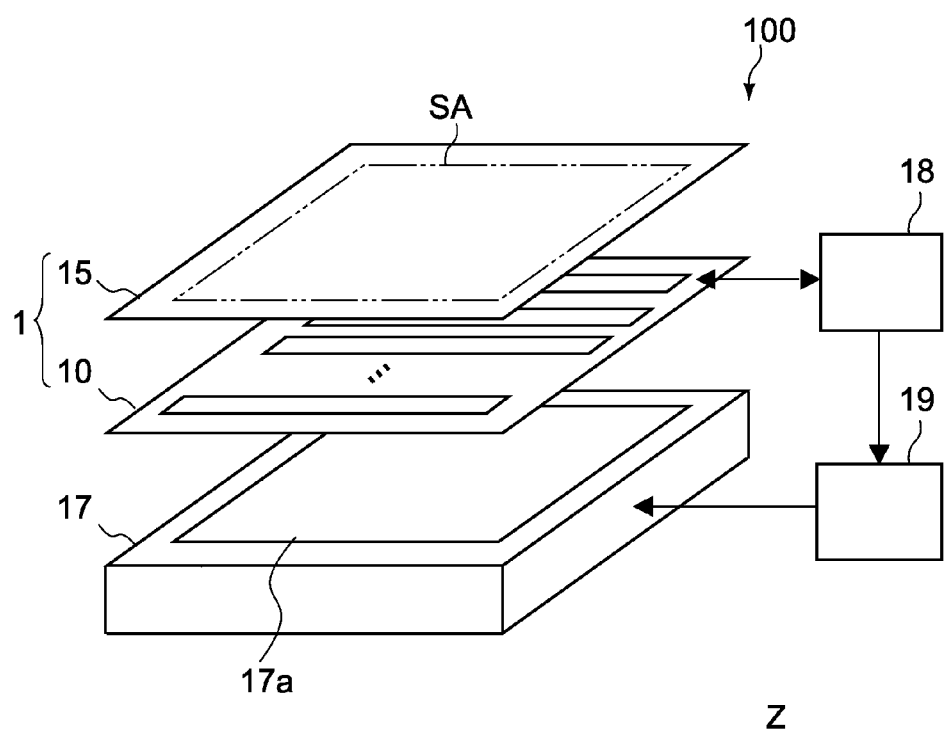
FIG. 1 is an exploded schematic perspective view of a coordinate detection apparatus according to an embodiment of the present application.

FIG. 1 is an exploded schematic perspective view of a configuration of a coordinate detection apparatus according to an embodiment of the present application. A coordinate detection apparatus 100 according to this embodiment is incorporated in a screen display section of one of various electronic apparatuses, for example, a portable information terminal, a digital camera, a video camera, a personal computer, or a car navigation system, to thereby constitute, as a user interface, a display apparatus.
(Coordinate Detection Apparatus)

The coordinate detection apparatus 100 includes a capacitance sensor 1, a display element 17, a drive section 18, and a control section 19. It should be noted that in the figure, a case for housing the capacitance sensor 1, the display element 17, and the like, is not shown.

Figure 2:
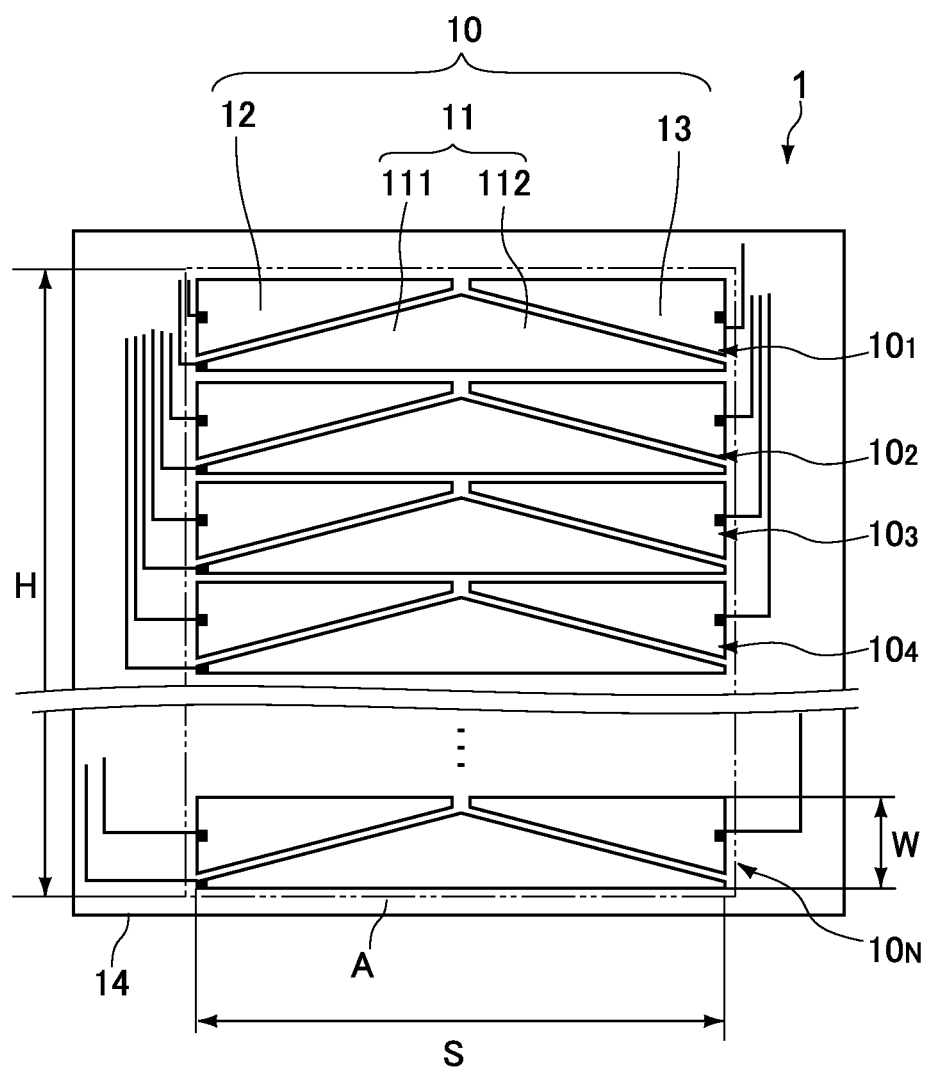
FIG. 2 is a schematic plane view of a capacitance sensor according to the embodiment of the present application.

FIG. 2 is a schematic plane view of a configuration of the capacitance sensor 1. The capacitance sensor 1 includes a detection area A. The capacitance sensor 1 is placed on an operation screen 17a of the display element 17, and is configured as a sensor panel for detecting proximity or contact of a detection target (e.g. a user's finger) within the detection area A in accordance with changes in capacitance. Here, in FIGS. 1 and 2, an X-axis denotes an axis parallel to a transverse side of the operation screen 17a, a Y-axis denotes an axis parallel to a longitudinal side of the operation screen 17a, and a Z-axis denotes an axis vertical to the operation screen 17a.

The capacitance sensor 1 has a plurality of electrode arrays $10_1$, $10_2$, $10_3$, $10_4$, ..., $10_N$ and a support body 14 for supporting these electrode arrays, as shown in FIG. 2. The electrode arrays are arranged along a Y-axis direction with a constant pitch on a surface of the support body 14. In FIG. 2, the electrode arrays are given reference numerals $10_1$, $10_2$, $10_3$, $10_4$, ..., $10_N$ in sequence along a +Y-direction (second direction). The electrode arrays are identical in configuration, and therefore are collectively called "electrode arrays 10" herein, except for the cases where the electrode arrays are individually described.

As shown in FIG. 2, the electrode array 10 includes a first electrode 11, a second electrode 12, and a third electrode 13. In this embodiment, the electrode array 10 has a structure obtained by dividing a rectangle having a length S and a width W into three parts of the first electrode 11, the second electrode 12, and the third electrode 13 each of which extends in an X-axis direction. Here, the length S denotes the length of the electrode array 10 along the X-axis direction, and the width W denotes the width of the electrode array 10 along the Y-axis direction. FIG. 3 is an enlarged plane view of one electrode array 10.

The first electrode 11 has a bottom side 11a parallel to the X-axis direction (first direction). The length S of the bottom side 11a is made almost equal to a lateral dimension of the detection area A. That is, the first electrode 11 is wide so as to cover the lateral dimension of the detection area A along the X-axis direction.

The first electrode 11 includes a first region 111 and a second region 112. The first region 111 is gradually larger in width, with respect to a length direction parallel to a +X-direction, in parallel with the +Y-direction. The second region 112 is gradually smaller in width with respect to the +X-direction. Specifically, in this embodiment, the first electrode 11 is formed of an approximate isosceles triangle having two oblique sides 11b and 11c forming a maximum value of the width in a central part in its length direction.

The second electrode 12 is opposed to the first region 111 in the Y-axis direction, and is formed so as to be gradually smaller in width, with respect to the +X-direction, in parallel with the +Y-direction. In this embodiment, the second electrode 12 is formed of an approximate right-angled triangle having a bottom side 12a, an oblique side 12b, and an adjacent side 12c. The bottom side 12a is parallel to the bottom side 11a of the first electrode 11 and is approximately half of the length of the bottom side 11a. The oblique side 12b is opposed to the oblique side 11b of the first electrode 11. The adjacent side 12c is adjacent to these sides. The oblique side 11b of the first electrode 11 and the oblique side 12b of the second electrode 12 form an identical angle of inclination with respect to the X-axis. The two oblique sides 11b and 12b have a constant clearance therebetween. There is no particular limitation on the size of the clearance, as far as the clearance provides electric isolation between the first region 111 and the second electrode 12.

The third electrode 13 is opposed to the second region 112 in the Y-axis direction, and is formed to be gradually larger in width, with respect to the +X-direction, in parallel with the +Y-direction. In this embodiment, the third electrode 13 is formed of an approximate right-angled triangle having a bottom side 13a, an oblique side 13b, and an adjacent side 13c. The bottom side 13a is parallel to the bottom side 11a of the first electrode 11 and is approximately half of the length of the bottom side 11a. The oblique side 13b is opposed to the oblique side 11c of the first electrode 11. The adjacent side 13c is adjacent to these sides. The oblique side 11c of the first electrode 11 and the oblique side 13b of the third electrode 13 form an identical angle of inclination with respect to the X-axis. The two oblique sides 11c and 13b have a constant clearance therebetween. There is no particular limitation on the size of the clearance, as far as the clearance provides electric isolation between the second region 112 and the third electrode 13.

The second electrode 12 and the third electrode 13 are opposed to each other in the X-axis direction while sandwiching the clearance therebetween, and are symmetrical with respect to a straight line parallel to the Y-axis direction passing through the central part of the first electrode 11.

The support body 14 is opposed to an image display surface (operation screen 17a) of the display element 17. The support body 14 supports the plurality of electrode arrays 10 thus configured, so as to keep the electrode arrays 10 arranged with a predetermined pitch in the Y-axis direction. The support body 14 is formed of a flexible, electrical isolating plastic film of polyethylene terephthalate (PET), polyethylene naphthalate (PEN), polyimide (PI), polycarbonate (PC), or the like. Alternatively, the support body 14 may use a rigid material such as glass and ceramics.

In addition, the support body 14 may be made of a laminate body of a plastic film and a glass substrate, for example. In this case, for example, the electrode arrays 10 are formed on one surface of the plastic film, and the glass substrate is laminated on the other surface of the plastic film via an adhesive layer.

The electrode array 10 (first to third electrodes 11 to 13) and the support body 14 are each formed of translucent materials. For example, the electrode array 10 is formed of a transparent conductive oxide such as indium tin oxide (ITO), SnO, and ZnO. The support body 14 is formed of a transparent resin film of PET, PEN, or the like. Accordingly, it is possible to see an image displayed on the operation screen 17a from the outside through the capacitance sensor 1.

There is no particular limitation on the formation method for the electrode arrays 10. For example, a conductive film constituting the electrode array 10 may be formed on the support body 14, using a thin-film formation method such as vapor deposition, sputtering, and CVD. In this case, after formation of the conductive film on a substrate, the conductive film may be patterned in a predetermined shape. Alternatively, after formation of the conductive film on a surface of the substrate with a resist mask, an excessive conductive film may be removed (lifted off) together with the resist mask from the substrate. Besides, an electrode pattern may be formed on the substrate using a printing method such as plating or screen printing.

The electrode array 10 further includes signal lines (wiring lines) for connecting the first to third electrodes 11 to 13 to the drive section 18. In this embodiment, as shown in FIG. 3, a signal line 11s is connected to one end of the first electrode 11 in the length direction, and signal lines 12s and 13s are connected to the sides 12c and 13c of the second electrode 12 and the third electrode 13 directed toward the outside of the detection area A, respectively.

The signal lines 11s to 13s are routed in an area outside of the detection area A on the support body 14, and are connected to the drive section 18 via external connection terminals such as connectors (not shown). In addition, the signal lines 11s to 13s are independently formed for each of the electrode arrays 10 in each column, and are connected to the common drive section 18.

The signal lines 11s to 13s may be formed of a constitutional material for the electrode array 10. In this case, the signal lines 11s to 13s can be formed simultaneously with formation of the electrode array 10. Meanwhile, the signal lines 11s to 13s may be formed of a non-translucent conductive material, for example, metal lines of aluminum (Al), silver (Ag), copper (Cu), or the like. In this case, a wiring line layer can be made of a low-resistivity material, which allows detection of changes in capacitance of the electrode array 10 with high sensitivity. In addition, since the signal lines 11s to 13s are positioned outside of the detection area A, it is possible to prevent that the signal lines 11s to 13s impair image visibility as far as the outside of the detection area A is out of an effective pixel area of the operation screen 17a.

The length S of the electrode array 10 is set to the lateral dimension of the detection area A. The length S of the electrode array 10 may be equal to, larger than, or smaller than the lateral dimension of the detection area A. What matters is, the single electrode array 10 is formed so as to have such a size that the electrode array 10 covers the full width of the detection area A, and two or more electrode arrays 10 are prevented from being arranged in parallel, with respect to the X-axis direction.

Meanwhile, the width W of the electrode array 10 is set as appropriate in accordance with a longitudinal dimension of the detection area A, the size of a detection target, a detection resolution in the Y-axis direction, or the like. In this embodiment, a user's finger is assumed as the detection target, and the width W is set to 5 mm to 10 mm, for example, in consideration of the size of a part of the finger in contact with the operation surface. Similarly, there is no particular limitation on the number of columns of the electrode arrays 10 along the Y-axis direction. The number of columns is set as appropriate in accordance with the longitudinal dimension of the detection area A, the size of the detection target, the detection resolution in the Y-axis direction, or the like.

In addition, as shown in FIG. 3, a total sum of the width of the first electrode 11 and the width of the second electrode 12 and the third electrode 13 is made constant with respect to the +X-direction. This allows the height of the entire electrode array to be constant, to thereby make it possible to suppress occurrence of variations in detection sensitivity depending on the position of the detection target with respect to the X-axis direction.

Further, as shown in FIG. 1, the capacitance sensor 1 includes a protection layer 15 for covering the surface of each of the electrode arrays 10. The protection layer 15 is formed of a translucent resin film of PET, PEN or the like, a plastic plate, a glass sheet, or the like. In addition, an outermost surface of the protection layer 15 constitutes an operation surface to be touched and operated by a user.

(Drive Section)

The drive section 18 that drives the electrode array 10 includes a signal generation circuit for generating signal voltages to be supplied to the electrodes 11 to 13, and an arithmetic circuit for calculating capacitances of the electrodes 11 to 13 and changes in capacitance. There is no particular limitation on the signal voltages as far as the signals are capable of oscillating the electrodes 11 to 13. For example, the signals may be pulse signals with a predetermined frequency, high frequency signals, alternating current signals, or direct current signals. There is no particular limitation on the arithmetic circuit as far as the arithmetic circuit is capable of detecting capacitance of the oscillating electrodes or amounts of changes in capacitance. The arithmetic circuit according to this embodiment converts capacitance values into integer values (count values), and outputs them to the control section 19. The capacitance values may be capacitances of the electrodes or amounts of changes in capacitance.

In this embodiment, a so-called self-capacitance method is employed to detect capacitances and amounts of capacitance changes of the electrodes 11 to 13. The self-capacitance method is also called single-electrode method using only one electrode for sensing. The electrode for sensing has a floating capacitance with respect to a ground potential. When a grounded detection target such as a human body (a finger) comes close, the electrode increases in floating capacitance. The arithmetic circuit calculates proximity and position coordinates of the finger by detecting this capacitance increase.

There is no particular limitation on the order of oscillation of the electrodes 11 to 13, that is, scanning method for the electrodes 11 to 13. The electrodes 11 to 13 may be oscillated in sequence in the width direction (+X-direction) or in the opposite direction (−X-direction). In addition, the electrode arrays may be oscillated instantaneously or sequentially (in the Y-direction, for example).

Further, all the electrodes 11 to 13 of the electrode arrays 10 may not be oscillated at any time but may be oscillated with omission of predetermined electrodes. For example, only the first electrodes 11 of all the columns (or some of the columns with predetermined omissions) may be oscillated until proximity of the detection target (such as a user's finger) is detected, and then the number of electrodes to be oscillated may be increased with increasing proximity of the detection target. In addition, electrodes to be oscillated may be selected in a display mode of the operation screen 17a. For example, if images, on which input operations by a finger should be performed, are densely located on the left side of the screen, only the second electrodes 12 may be scanned, and in contrast, if those images are densely located on the right side of the screen, only the third electrodes 13 may be scanned. This makes it possible to save the electrodes to be driven, as compared with the case where all the electrodes are scanned.

(Control Section)

The control section 19 generates control signals for controlling an image displayed on the operation screen 17a of the display element 17 in accordance with output from the drive section 18, and outputs them to the display element 17. The control section 19 typically includes a computer which identifies an operating position, an operating direction, and the like of a finger in the detection area A, and performs predetermined image control operations in accordance with results of the detection. For example, the control section 19 performs screen control operations according to the user's intention, such as changing images on the screen correspondingly to the operating position and moving an image along the operating direction.

Further, the control section 19 may generate other control signals for controlling other functions of the coordinate detection apparatus 100. For example, the control section 19 may allow various functions to be performed, such as telephone calling, line switching, dictionary searching, text information input, and game playing, depending on the operating position on the operation screen 17a.

The control section 19 may not necessarily be formed of a circuit separated from the drive section 18, but may include a circuit integrated with the drive section 18. For example, the control section 19 and the drive section 18 may be configured by a single semiconductor chip (IC chip). The drive section 18 and the control section 19 constitute a processing unit of the coordinate detection apparatus 100.

(Example of Operations of Coordinate Detection Apparatus)

Next, an example of operations of the coordinate detection apparatus 100 will be described. Herein, a method of detecting an input operating position (XY-coordinates) of a finger with the use of the capacitance sensor 1 will be explained. It should be noted that, as described above, the control section 19 determines the input operating position.

Figure 4:
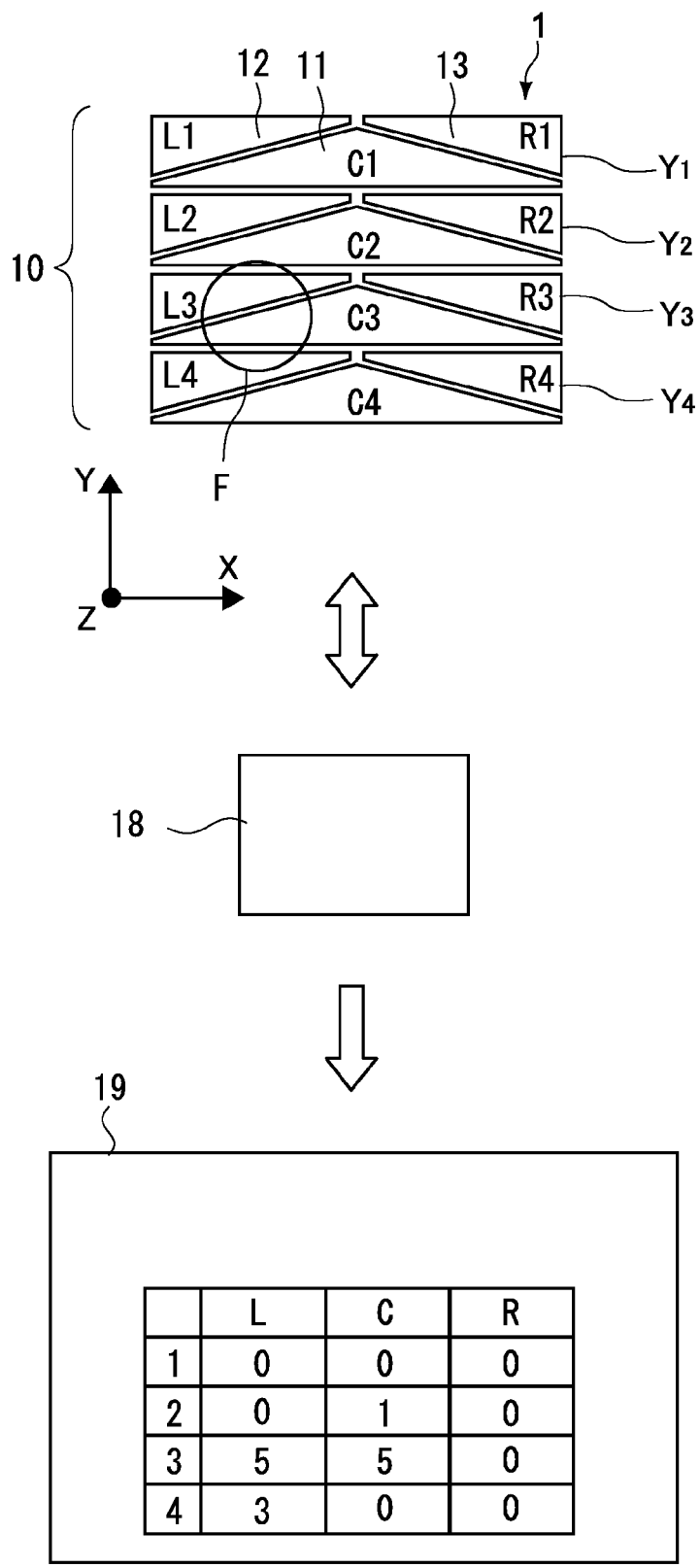
FIG. 4 is a view for illustrating an action of the coordinate detection apparatus.

FIG. 4 is a schematic view for illustrating an example of a method of detecting coordinates using the capacitance sensor 1. The capacitance sensor 1 is driven by the drive section 18, and outputs changes in capacitance depending on the position and movement of a user's finger F (detection target), to the drive section 18. The drive section 18 converts capacitance values output from the electrodes 11 to 13 of the capacitance sensor 1 into count values, and outputs them to the control section 19. The control section 19 detects an X-coordinate and a Y-coordinate of the finger F in accordance with the count values from the electrodes 11 to 13 by using a calculation method as will be described later.

Hereinafter, regarding the electrode arrays, the first electrodes 11 located in the center are referred to as electrodes $C_1$, $C_2$, $C_3$, $C_4$, the second electrodes 12 located on a left-hand side are referred to as electrodes $L_1$, $L_2$, $L_3$, $L_4$, and the third electrodes 13 located on a right-hand side are referred to as electrodes $R_1$, $R_2$, $R_3$, $R_4$. It is assumed that the capacitance sensor 1 includes four electrode arrays $Y_1$, $Y_2$, $Y_3$, $Y_4$ in four columns, and the center of the finger F is positioned between the electrode $L_3$ and the electrode $C_3$. Under this condition, one example of the count values of the electrodes to be calculated by the drive section 18 is shown in FIG. 4.

(Detection of Y-coordinate)

In the capacitance sensor 1, each of the electrode arrays 10 constitutes a single detection group. Regarding an operating position in the Y-axis direction, proximity or contact of the detection target is detected in accordance with a total sum of capacitance values of the electrodes L, C, R constituting the electrode array 10. The control section 19 calculates a total sum ($\Sigma Y_n$ (n is a column number)) of changes in capacitance of the electrodes L, C, R in each of the columns of the plurality of electrode arrays, and detects a Y-coordinate of the finger F in accordance with these values.

Figure 5:
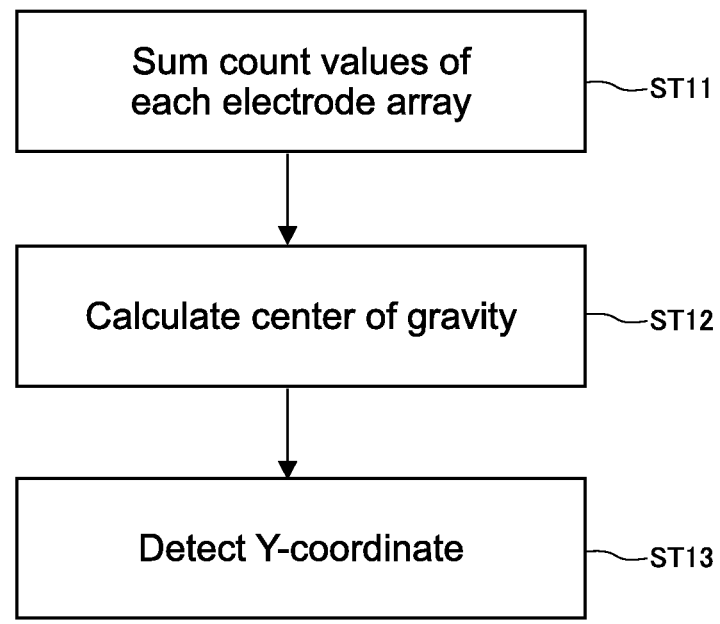
FIG. 5 is a flowchart for illustrating the action of the coordinate detection apparatus.

FIG. 5 is a flowchart for illustrating a method of detecting the Y-coordinate. The control section 19 first sums the count values of each of the electrode arrays (ST11). Next, the control section 19 calculates, based on central positions ($Y_1c$, $Y_2c$, $Y_3c$, $Y_4c$) and summed count values ($\Sigma Y_1$, $\Sigma Y_2$, $\Sigma Y_3$, $\Sigma Y_4$) of the electrode arrays $Y_1$, $Y_2$, $Y_3$, $Y_4$, a center of gravity of a Y-position using the following calculation equation, and detects the Y-coordinate of the finger F (ST12, ST13).

$$Y\text{-position}=(\Sigma Y_1*(Y_1c)+\Sigma Y_2*(Y_2c)+\Sigma Y_3*(Y_3c)+\Sigma Y_4*(Y_4c))/(\Sigma Y_1*\Sigma Y_2*\Sigma Y_3*\Sigma Y_4) \quad (1)$$

Where the central position of the electrode array corresponds to the Y-coordinate in the central part of each of the electrode arrays, and $Y_1c=2$ (mm), $Y_2c=6$ (mm), $Y_3c=10$ (mm), and $Y_4c=14$ (mm) are established. Substituting these values in Equation (1), the Y-position is detected: $((0*14)+(1*10)+(10*6)+(3*2))/(0+1+10+3)=5.42$ (mm)

(Detection of X-coordinate)

Figure 6:
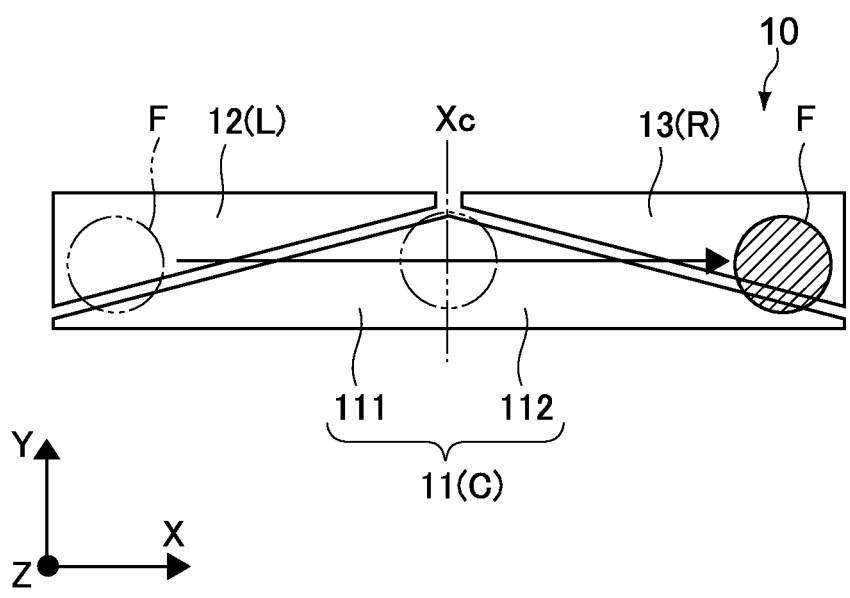
FIG. 6 is a plane view of the electrode array for illustrating an example of operations on the coordinate detection apparatus.
Figure 7A:
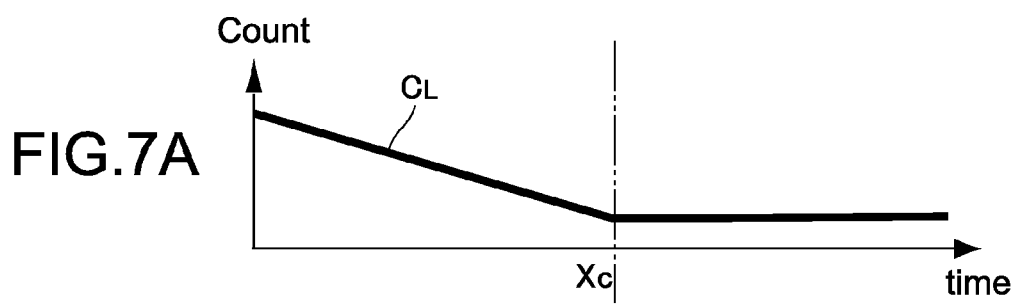
FIG. 7 are schematic views each showing an example of changes in capacitance of the electrode array due to the example of operations shown in FIG. 6.
Figure 7B:
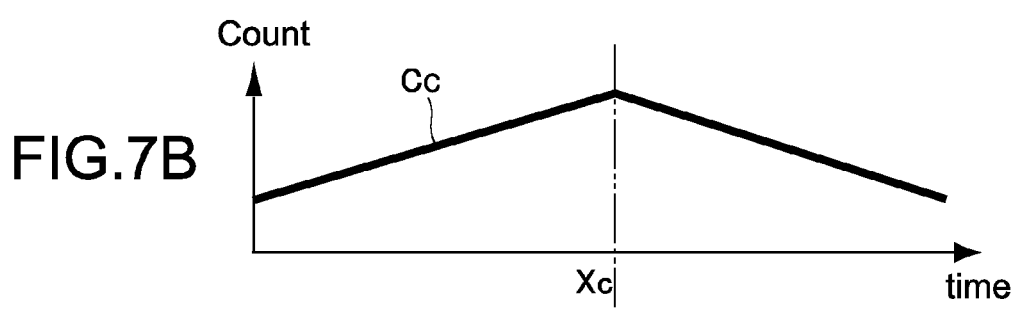
Figure 7C:
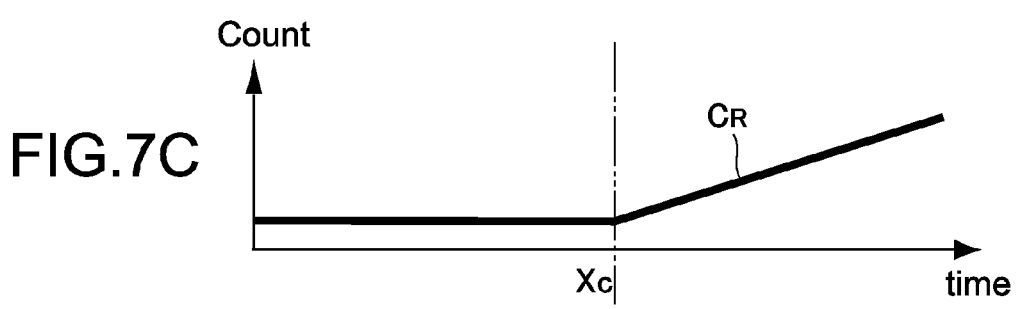

Next, changes in capacitance of the electrodes L, C, D when as shown in FIG. 6, the finger F is moved directly on an arbitrary electrode array 10 at a constant speed along the +X-direction will be described. FIG. 7A shows changes over time in capacitance (count value) $C_L$ of the electrode L. FIG. 7B shows changes over time in capacitance (count value) $C_C$ of the electrode C. FIG. 7C shows changes over time in capacitance (count value) $C_R$ of the electrode R.

Let us consider the case where the finger F moves from a position shown by the alternate long and short dash line in FIG. 6 toward the central part of the electrode array 10 in the length direction (X-axis direction). The electrode C includes the first region 111 gradually larger in width with respect to the +X-direction. The electrode L is formed to be gradually smaller in width with respect to the +X-direction. Therefore, depending on the movement of the finger F to the +X-direction, an overlap area in which the finger F and the electrode C (first region 111) overlap with each other becomes gradually larger, but an overlap area in which the finger F and the electrode L overlap with each other becomes gradually smaller. The capacitance value is almost proportional to the size of the overlap area with the finger F. Therefore, as shown in FIG. 7B, the capacitance of the electrode C becomes gradually larger and reaches a maximum value in a central position (Xc) in the length direction. In contrast, as shown in FIG. 7A, the capacitance of the electrode L becomes gradually smaller and reaches a minimum value in the central position (Xc) in the length direction. Meanwhile, the electrode R does not overlap with the finger F, and thus the amount of change in capacitance of the electrode R is zero.

Similarly, let us consider the case where the finger F moves from the central part of the electrode array 10 in the length direction to a position shown by the solid line in FIG. 6. The electrode C includes the second region 112 gradually smaller in width with respect to the +X-direction. The electrode R is formed to be gradually larger in width with respect to the +X-direction. Therefore, depending on the movement of the finger F to the +X-direction, the overlap area in which the finger F and the electrode C (second region 112) overlap with each other becomes gradually smaller, while an overlap area in which the finger F and the electrode R overlap with each other becomes gradually larger. As a result, as shown in FIG. 7B, the capacitance of the electrode C becomes gradually smaller. In contrast, as shown in FIG. 7C, the capacitance of the electrode R becomes gradually larger. Meanwhile, the electrode L does not overlap with the finger F, the amount of change in capacitance of the electrode L is zero.

In this embodiment, the electrode array 10 is constant in width with respect to its length direction. Therefore, irrespective of the operating position of the finger F, constant detection sensitivity for the finger F can be obtained with respect to the X-axis direction. In addition, the electrode C is formed of an isosceles triangle, and the electrodes L, R have a symmetrical shape. It is possible to eliminate occurrence of variations in detection sensitivity on a first region 111 side and a second region 112 side. Accordingly, it becomes possible to detect the operating position of the finger F in the X-axis direction with high accuracy.

In addition, in this embodiment, a boundary between the electrode C and the electrode L and a boundary between the electrode C and the electrode R are formed of the straight oblique sides 11b and 12b, 11c and 13b, respectively. Accordingly, by setting a predetermined proportional relationship between a position of the detection target along the X-axis direction and a capacitance ratio between the electrodes, it is possible to ensure stable detection sensitivity.

Next, a method of calculating the X-coordinate by the control section 19 will be described.

In this embodiment, the control section 19 calculates a total sum ($\Sigma C$) of the capacitance values of the electrodes C ($C_1$, $C_2$, $C_3$, $C_4$) of the electrode arrays 10, a total sum ($\Sigma L$) of the capacitance values of the electrodes L ($L_1$, $L_2$, $L_3$, $L_4$) of the electrode arrays 10, a total sum ($\Sigma R$) of the capacitance values of the electrodes R ($R_1$, $R_2$, $R_3$, $R_4$) of the electrode arrays 10, and a total sum ($\Sigma LCR$ ($=\Sigma L+\Sigma C+\Sigma R$)) of the capacitance values of these electrodes. In the case where $\Sigma L$ is larger than $\Sigma R$, the control section 19 detects, in accordance with a first capacitance ratio (P1) being a ratio of a difference between $\Sigma C$ and $\Sigma L$ to $\Sigma LCR$, the X-coordinate of the finger F. Meanwhile, in the case where $\Sigma L$ is smaller than $\Sigma R$, the control section 19 detects, in accordance with a second capacitance ratio (P2) being a ratio of a difference between $\Sigma R$ and $\Sigma C$ to $\Sigma LCR$, the X-coordinate of the finger F.

FIGS. 8A to 8C are schematic views of the capacitance sensor, each of which shows a magnitude relationship between $\Sigma L$ and $\Sigma R$ depending on the operating position of the finger F. As mentioned above, when the finger F is detected, the total sums of capacitance values of the electrodes L, C, R of the plurality of electrode arrays 10 and the total sum of the capacitance values of all of the electrodes L, C, R are referred to. In the capacitance sensor using the self-capacitance method, when the finger F is positioned on the left-hand side in the operation area, $\Sigma L > \Sigma R$ is established (FIG. 8A). When the finger F is positioned on the right-hand side in the operation area, $\Sigma L < \Sigma R$ is established (FIG. 8C). When the finger F is positioned in the center of the operation area, $\Sigma L \approx \Sigma R$ is established (FIG. 8B).

Figure 9:
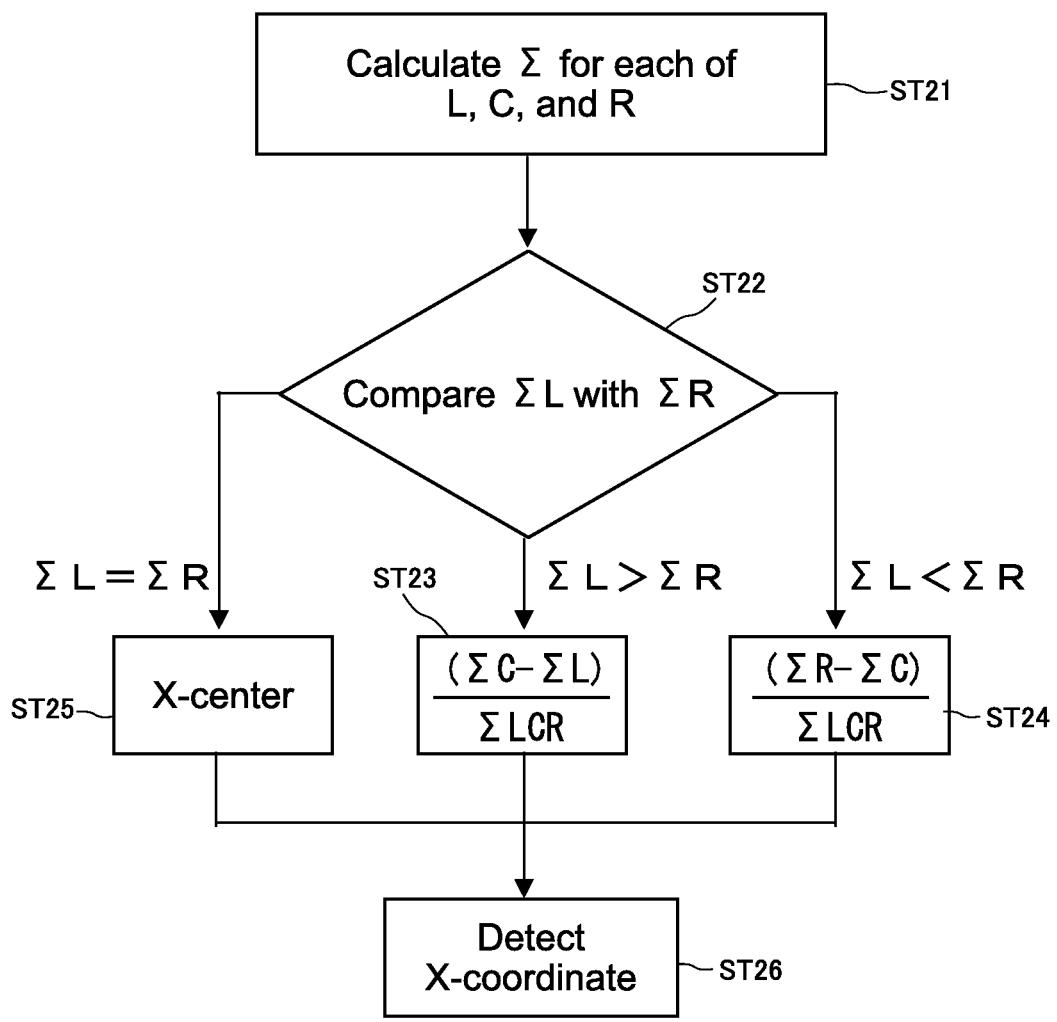
FIG. 9 is a flowchart for illustrating an action of the coordinate detection apparatus.

FIG. 9 is a flowchart for illustrating the method of detecting the X-coordinate. The control section 19 first calculates the total sums ($\Sigma L$, $\Sigma C$, $\Sigma R$) of the capacitance values regarding the electrodes L, C, R in the columns (ST21). Next, the control section 19 compares $\Sigma L$ with $\Sigma R$ (ST22). In the case of $\Sigma L > \Sigma R$, the control section 19 detects the first capacitance ratio P1 by using the following Equation (2), and detects the X-coordinate of the finger F (ST23, ST26). In the case of $\Sigma L < \Sigma R$, the control section 19 calculates the second capacitance ratio P2 by using the following Equation (3), and detects the X-coordinate of the finger F (ST24, 26). In the case of $\Sigma L = \Sigma R$, the control section 19 determines that the finger F is positioned in the central part of the electrode C in the length direction (X-axis direction), and considers it as the X-coordinate (ST25, ST26).

$$P1 = (\Sigma C - \Sigma L)/\Sigma LCR \qquad (2)$$

$$P2 = (\Sigma R - \Sigma C)/\Sigma LCR \qquad (3)$$

In this embodiment, the X-coordinate is detected in accordance with the first capacitance ratio P1 or the second capacitance ratio P2 selected depending on the magnitude relationship between $\Sigma L$ and $\Sigma R$. A linearity of detected coordinate values along the X-axis direction can be favorably obtained, and thus it is possible to improve detection accuracy for the X-coordinate.

Figure 10A:
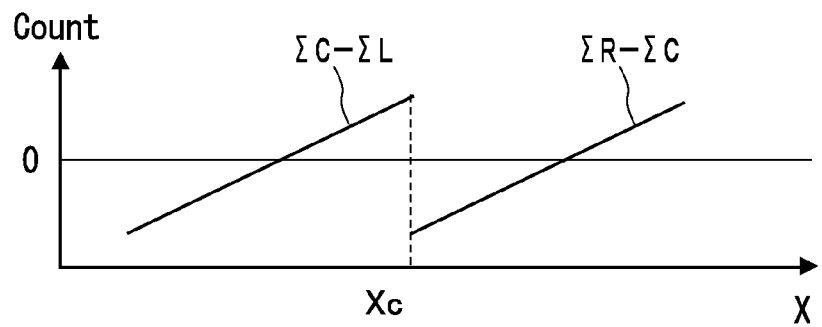
FIG. 10 are views for illustrating an action of the coordinate detection apparatus and a comparative example thereof.
Figure 10B:
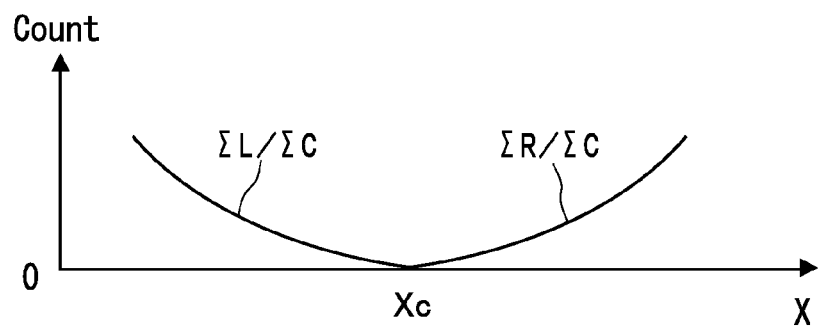

FIGS. 10A and 10B show one example of detected values of X-coordinates calculated by two coordinate detection methods using different calculation methods. FIG. 10A shows an X-coordinate value calculated based on a difference in capacitance value between two predetermined electrodes as in this embodiment. FIG. 10B shows an X-coordinate value calculated based on a ratio between capacitance values of two predetermined electrodes. As will be clear from the results shown in FIGS. 10A and 10B, in this embodiment, a favorable linearity of the count values along the X-axis direction can be obtained.

In this embodiment, for calculation of $\Sigma L - \Sigma R$, predetermined threshold values may be set. That is, the control section 19 may detect, in the case where the difference between $\Sigma L$ and $\Sigma R$ is larger than a first threshold (A1) ($\Sigma L - \Sigma R > A1$), the X-coordinate in accordance with the first capacitance ratio P1, and may detect, in the case where the difference between $\Sigma L$ and $\Sigma R$ is smaller than a second threshold (A2) smaller than the first threshold ($\Sigma L - \Sigma R < A2$), the X-coordinate in accordance with the second capacitance ratio P2. Here, in the case where the difference between $\Sigma L$ and $\Sigma R$ is equal to or larger than the second threshold (A2) and is equal to or smaller than the first threshold (A1) ($A2 \leq \Sigma L - \Sigma R \leq A1$), it is determined that the X-coordinate corresponds to the central part of the electrode C in the length direction.

Accordingly, it is possible to suppress variations in coordinate value due to detection error of the count values, and to improve the detection accuracy. There is no particular limitation on the magnitudes of the threshold values A1, A2, and these can be set as appropriate in accordance with the shape and size of the electrodes, the detection resolution of the count values, and the like. Also, there is no particular limitation on the magnitude relationship between the threshold values A1, A2, and, for example, $A2 = -A1$ may be set.

Figure 11A:
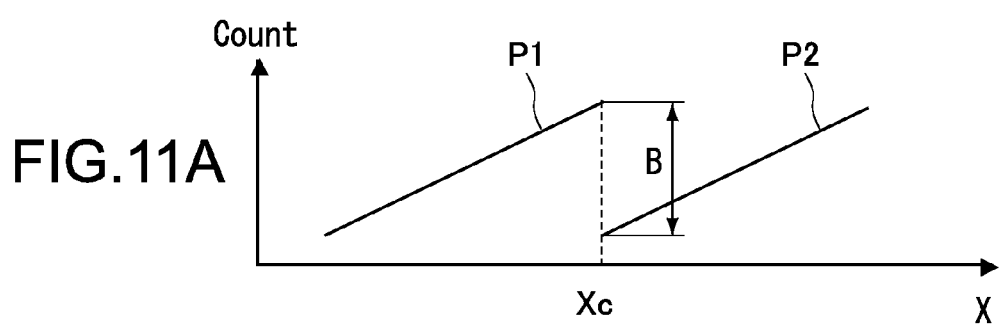
FIG. 11 are views for illustrating an action of the coordinate detection apparatus.

In addition, in this embodiment, as shown in FIG. 11A, transition of the count values of the first capacitance ratio P1 and the second capacitance ratio P2 is discontinuous in the central position Xc of the electrode C in the length direction. Therefore, the control section 19 adds an offset coefficient to at least one of the first capacitance ratio P1 and the second capacitance ratio P2 so that the first capacitance ratio P1 and the second capacitance ratio P2 are equal to each other in the central position Xc of the electrode C with respect to the X-axis direction. Accordingly, a continuity of the X-coordinates can be obtained with respect to the length direction of the electrode array 10.

Figure 11B:
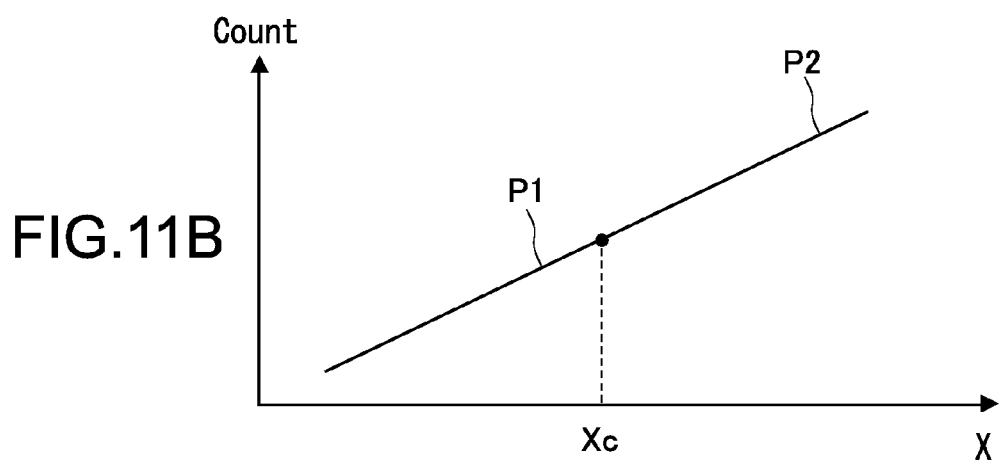

Any offset coefficient can be used as far as it is enough to offset a difference B between the count values of the first capacitance ratio P1 and the second capacitance ratio P2 in the Xc position shown in FIG. 11A. The value B may be added to the calculation equation for the first capacitance ratio. Alternatively, as shown in FIG. 11B, the value B may be added to the second capacitance ratio P2. Still alternatively, provided that $B = b1 + b2$ is established, a first coefficient b1 may be added to the first capacitance ratio P1 and a second coefficient b2 may be added to the second capacitance ratio P2.

Figure 12A:
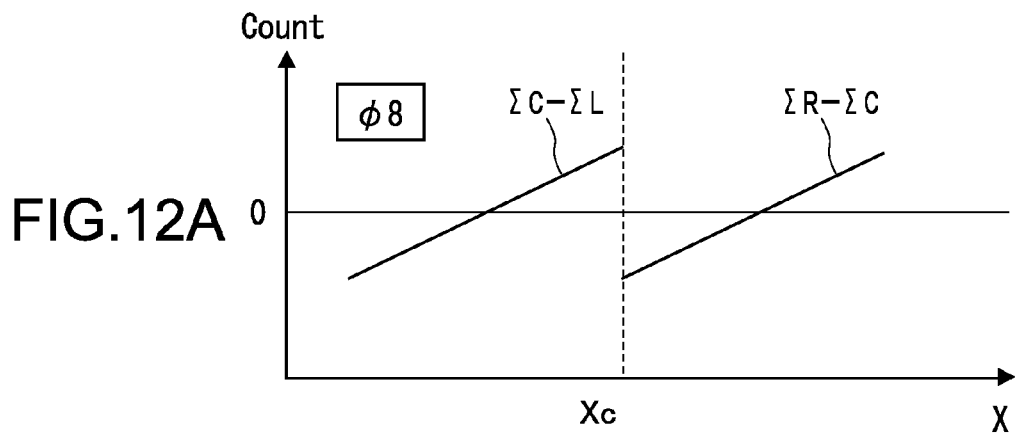
FIG. 12 are views for illustrating an action of the coordinate detection apparatus.
Figure 12B:
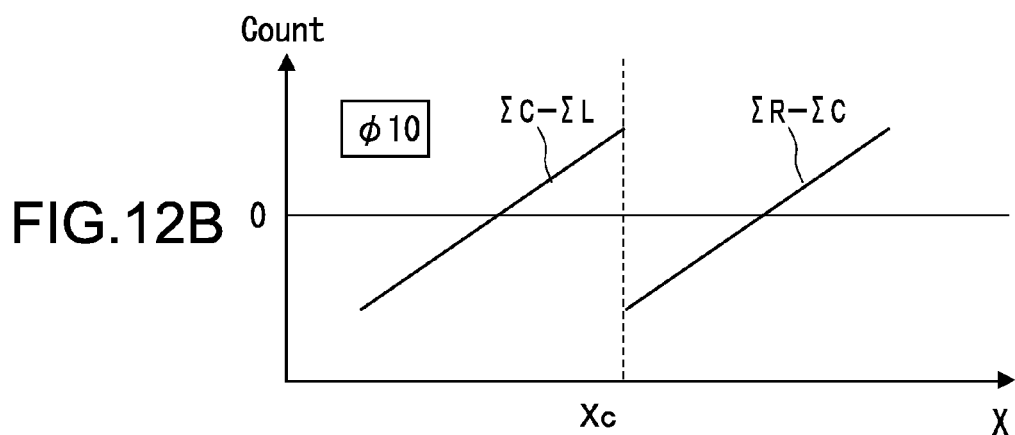
Figure 12C:
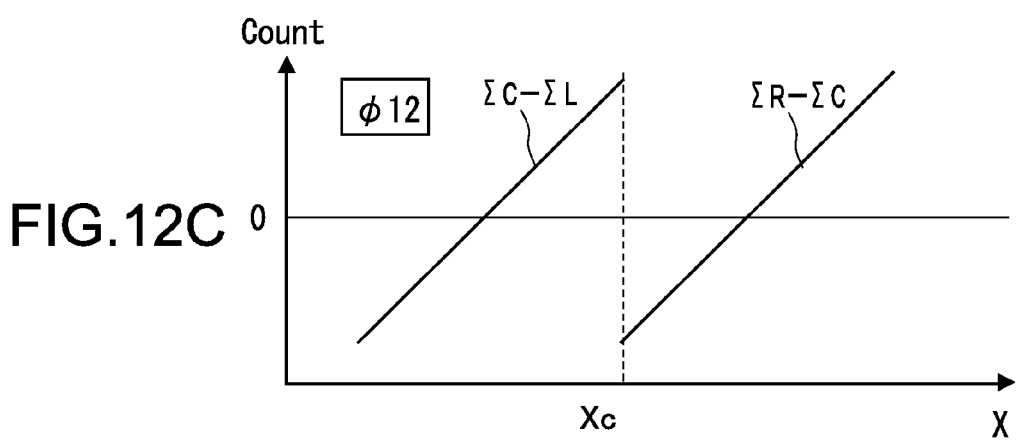

Further, the count values of the capacitance values are influenced by an area in which the electrode arrays 10 and the finger F are opposed to each other. FIGS. 12A to 12C show one example of relationships between the size of the finger F and differences in capacitance ($\Sigma C - \Sigma L$, $\Sigma R - \Sigma C$) between the electrodes. Here, the differences in capacitance between the electrodes were calculated based on changes in capacitance when the tips of metal sticks, each of which has a diameter of 8 mm, 10 mm, or 12 mm, were moved along the longitudinal direction of the electrode array 10. As shown in FIG. 12, it can be seen that as an area in which the electrode arrays 10 and the metal stick are opposed to each other becomes larger, the rate of change of the difference in capacitance between the electrodes (slope of the straight line) becomes larger.

In this embodiment, in calculation of the capacitance ratios P1, P2, each of the differences in capacitance between the electrodes is divided by all count values ($\Sigma LCR$) of all electrodes. Therefore, in comparison with the case of using the differences in capacitance between the electrodes, variation in the rate of change of the difference in capacitance due to a difference in area in which the electrode arrays and the detection target are opposed to each other is smaller. Thus, by dividing each of the differences in capacitance between the electrodes by $\Sigma LCR$, the size of the detection target can be normalized. With this normalization, the influence of the size of the detection target is reduced, and thus coordinate detection with high accuracy can be achieved.

Further, the control section 19 is configured to multiply $\Sigma LCR$ by correction coefficients for suppressing the variation in the rate of change of the first and second capacitance ratios P1, P2 depending on the area in which the plurality of electrode arrays 10 and the finger F are opposed to each other, to thereby correct detected values of the X-coordinate. Accordingly, for the detection targets having different sizes, the rate of change in capacitance can be fixed. One example of calculation equations therefor is as follows:

$$P1=(\Sigma C-\Sigma L)/(\Sigma LCR*d1)+b1 \quad (4)$$

$$P2=(\Sigma R-\Sigma C)/(\Sigma LCR*d2)+b2 \quad (5)$$

Where the correction coefficients d1, d2 may be equal to each other, or do not need to be equal to each other. The correction coefficients d1, d2 may be larger than 1, or may be smaller than 1. The correction coefficients d1, d2 can be determined based on the rate of change of the capacitance ratios P1, P2 in the case of using a plurality of detection targets having different sizes. It should be noted that b1, b2 denote the above-mentioned offset coefficients.

By the way, for calculation of the first capacitance ratio P1, $\Sigma R$ is often substantially unnecessary in many cases. Therefore, for the calculation of the first capacitance ratio P1, a correction term for $\Sigma R$ may be added. Similarly, for the calculation of the second capacitance ratio P2, a correction term for $\Sigma L$ may be added. One example of calculation equations therefor is as follows:

$$P1=(\Sigma C-\Sigma L-\Sigma R)/(\Sigma LCR*d1)+b1 \quad (6)$$

$$P2=(\Sigma L+\Sigma R-\Sigma C)/(\Sigma LCR*d2)+b2 \quad (7)$$

EXPERIMENT EXAMPLE

Figure 13:
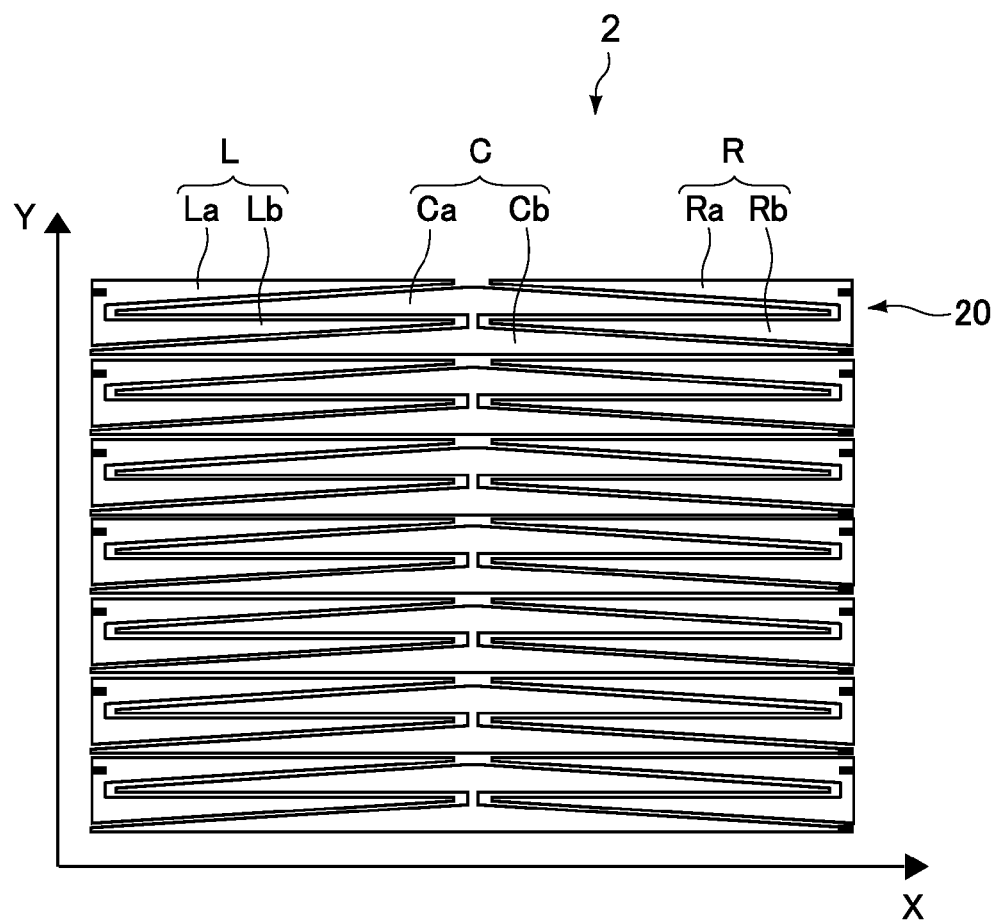
FIG. 13 is a plane view of another example of a configuration of the capacitance sensor.

The inventors of the present application used a capacitance sensor having an electrode structure as shown in FIG. 13. The offset coefficients b1, b2 and the correction coefficients d1, d2 in Equations (6), (7) above were determined. A capacitance sensor 2 shown in the figure has a configuration in which electrode arrays 20 each constituted of a group of an electrode C, an electrode L, and an electrode R are arranged in the Y-axis direction. Here, the capacitance sensor 2 was set to have a size to be applied to a three-inch wide display unit. In the capacitance sensor 2, by etching an ITO layer of an ITO film, electrodes were each formed. The number of electrode arrays 20 arranged was set to seven.

The electrodes C, L, R correspond to the electrodes 11, 12, 13 shown in FIG. 2, respectively. The electrodes C, L, R respectively include double electrode portions Ca, Cb, La, Lb, Ra, Rb. The respective double electrode portions are adjacent to each other in the Y-axis direction. The electrode portions are alternately arranged between the electrodes.

In this experiment, a grounded metal stick having a diameter of ($\phi$8 mm was placed directly on the electrode arrays 20, and was moved at a constant speed to the +X-direction, while capacitance values of the electrodes L, C, R were measured in predetermined plotted positions along the X-axis direction, and $\Sigma L$, $\Sigma C$, and $\Sigma R$ for each of the plotted positions were calculated. Also regarding metal sticks each having a diameter of $\phi$10 mm or $\phi$12 mm, in the same manner, $\Sigma L$, $\Sigma C$, and $\Sigma R$ for each of the plotted positions were calculated. After that, average values of $\Sigma L$, $\Sigma C$, and $\Sigma R$ of the metal sticks each having a diameter of $\phi$8 mm, $\phi$10 mm, and $\phi$12 mm were calculated, and correction values d1, d2 and offset coefficients b1, b2 were determined as shown by the following Equations:

$$P1=(\Sigma C-\Sigma L-\Sigma R)/(\Sigma LCR/60)-479 \quad (6)'$$

$$P2=(\Sigma L+\Sigma R-\Sigma C)/(\Sigma LCR/60)+483 \quad (7)'$$

<Second Embodiment>

Figure 14:
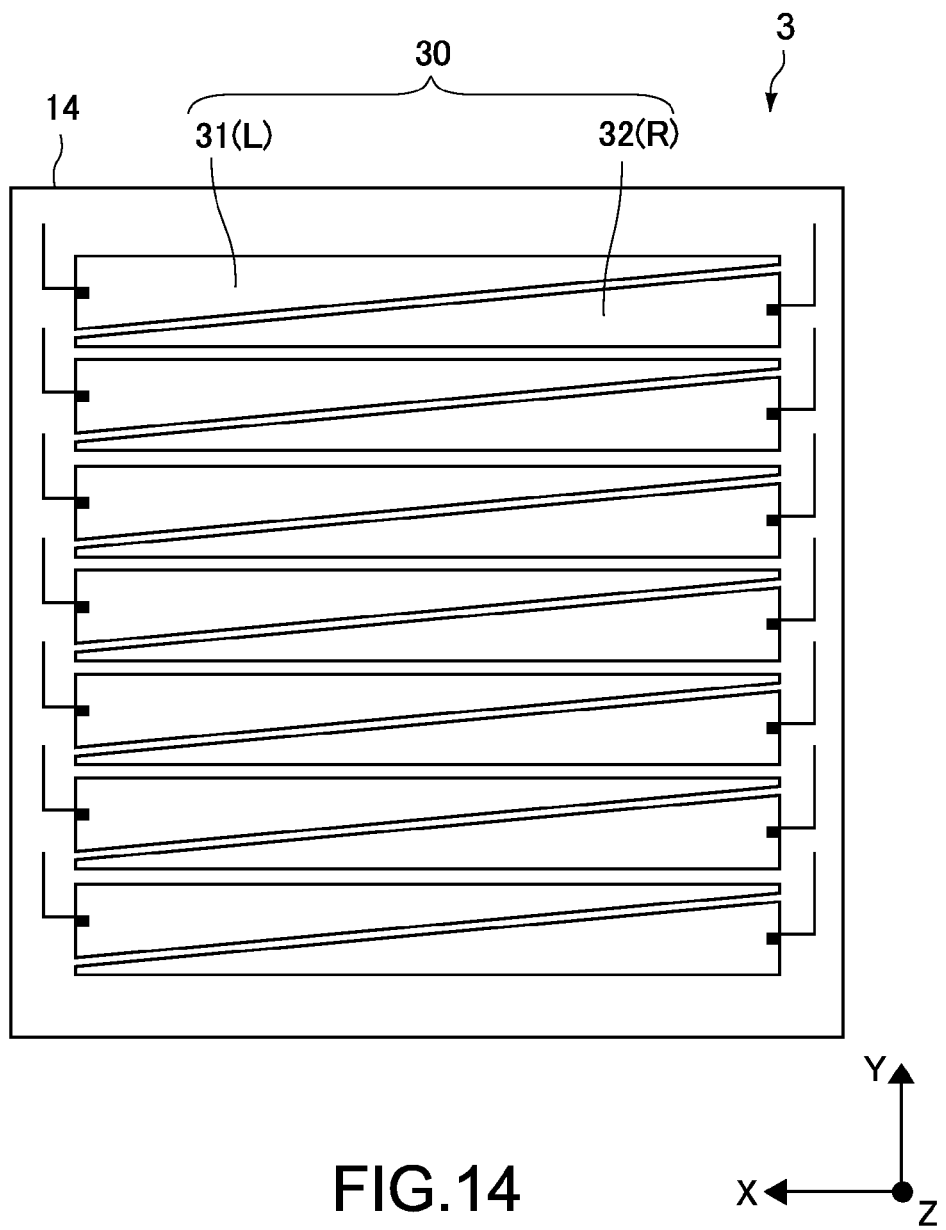
FIG. 14 is a plane view of a capacitance sensor for illustrating another embodiment of the present application.

Next, another embodiment of the present application will be described. FIG. 14 is a schematic plane view of a capacitance sensor 3 according to this embodiment. Hereinafter, components different from those of the first embodiment will be mainly described. The same components as those of the above-mentioned embodiment will be denoted by the same reference symbols and the description thereof will be omitted or simplified.

The capacitance sensor 3 according to this embodiment includes electrode arrays 30 each constituted of a pair of a first electrode 31 and a second electrode 32. The electrode arrays 30 are arranged on the support body 14 in the Y-axis direction. The first electrode 31 has a right-angled triangle shape extending in the X-axis direction and being gradually larger in width, with respect to the +X-direction, in parallel with the Y-axis direction. The second electrode 32 has a right-angled triangle shape extending in the X-axis direction and being gradually smaller in width, with respect to the +X-direction, in parallel with the Y-axis direction. The first and second electrodes 31, 32 include oblique sides opposed to each other in the Y-axis direction.

The capacitance sensor 3 is driven by the drive section 18 (FIG. 1). The drive section 18 detects changes in capacitance of each of the electrode arrays 30 depending on proximity of the detection target, and outputs them to the control section 19 (FIG. 1). The control section 19 calculates a total sum ($\Sigma L$) of capacitance values of the first electrodes 31 (L) of the electrode arrays 30, a total sum ($\Sigma R$) of capacitance values of the second electrodes 32 (R) of the electrode arrays 30, and a total sum ($\Sigma LR$ ($=\Sigma L+\Sigma R$)) of the capacitance values of these electrodes. Then, the control section 19 detects, in accordance with a capacitance ratio of a difference between $\Sigma L$ and $\Sigma R$ to $\Sigma LR$, the X-coordinate of the finger F.

In this embodiment, based on the value of ($\Sigma L-\Sigma R$)/$\Sigma LR$, the X-coordinate is detected. Therefore, a linearity of detected coordinate values along the X-axis direction can be favorably obtained, and thus it is possible to improve the detection accuracy for the X-coordinate.

On the other hand, for detection of the Y-coordinate, the control section 19 calculates a sum ($\Sigma LR$) of a capacitance value ($\Sigma L$) of the electrode L and a capacitance value ($\Sigma R$) of the electrode R for each of the electrode arrays 30, and detects, based on these sums, the Y-coordinate of the detection target along the Y-axis direction. In this case, as in the first embodiment described above, weighting may be used in the central position of each of the electrode arrays 30.

In the above, although the embodiments of the present application have been described, the present application is not limited only to the above-mentioned embodiments, but various modifications can be made without departing from the gist of the present application as a matter of course.

Figure 15A:
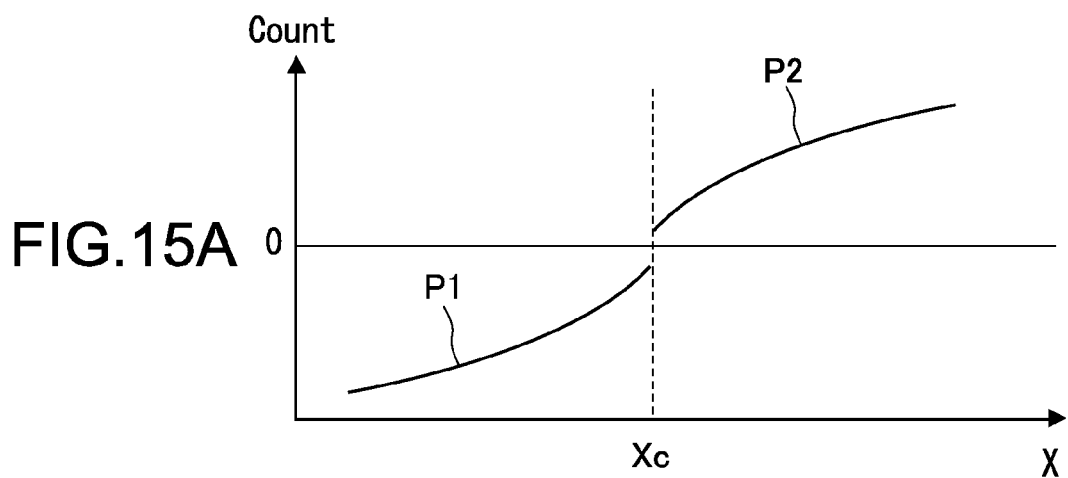
FIG. 15 are views for illustrating an action of a coordinate detection apparatus according to an embodiment of the present application.
Figure 15B:
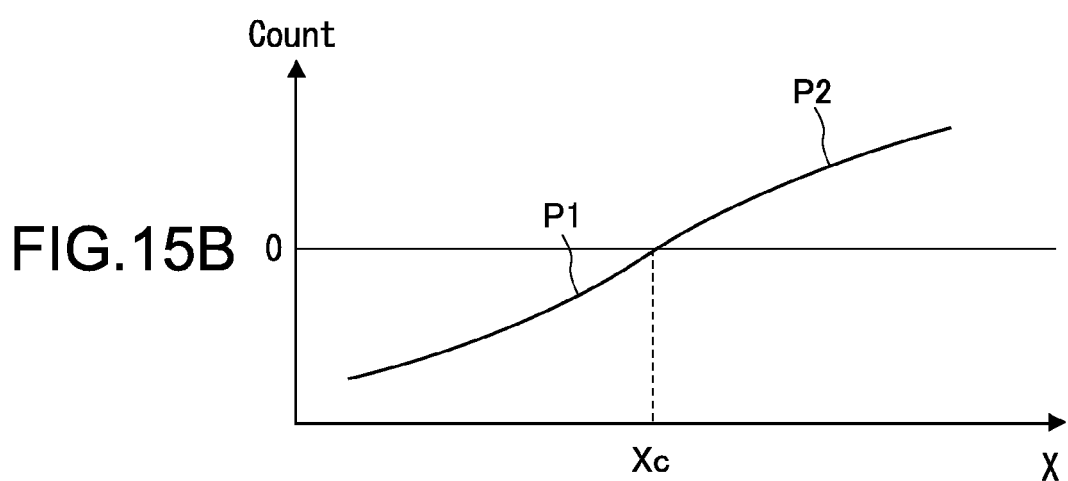

In the method of detecting an X-coordinate in accordance with the first and second capacitance ratios described above referring to the first embodiment, the correction for improving a linearity of each capacitance ratio may be performed by the control section 19. As such a correction equation, the following is exemplified:

$$P1=(((p*\Sigma C)-\Sigma L-\Sigma R/q))/((\Sigma L+(p*\Sigma C)+\Sigma R)*d1)+b1)+s \quad (8)$$

$$P2=(((\Sigma L/r)+\Sigma R-(p*\Sigma C))/((\Sigma L+(p*\Sigma C)+\Sigma R)*d2)+b2)+s \quad (9)$$

Where p denotes a correction coefficient for adjusting the magnitude of $\Sigma C$. The linearity is deteriorated in the case where the sensitivity of the electrode C is relatively low due to the pattern shape and resistance value of the constitutional material for the electrodes. However, it is possible to improve the linearity by adjusting the count value of ΣC. A linearity property before the correction is shown in FIG. 15A, and a linearity property after the correction is shown in FIG. 15B.

Figure 16A:
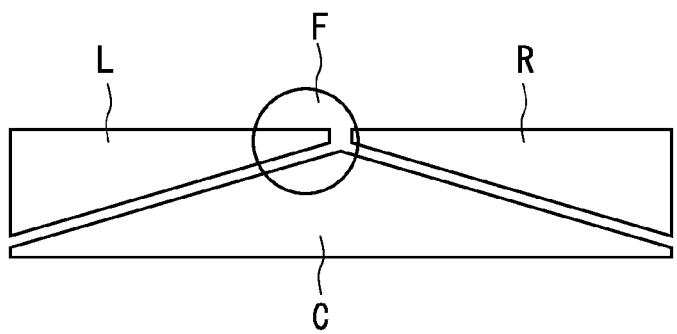
FIG. 16 are views for illustrating the action of the coordinate detection apparatus according to the embodiment of the present application.
Figure 16B:
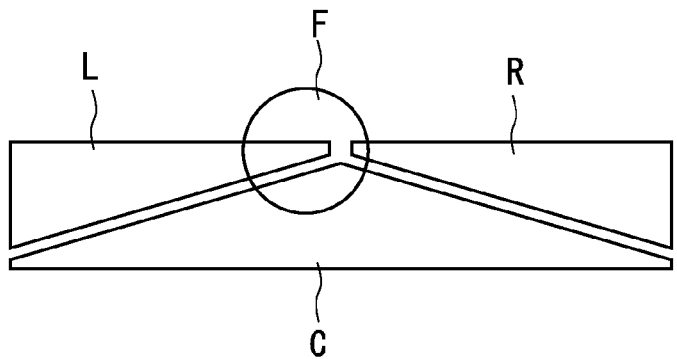
Figure 17A:
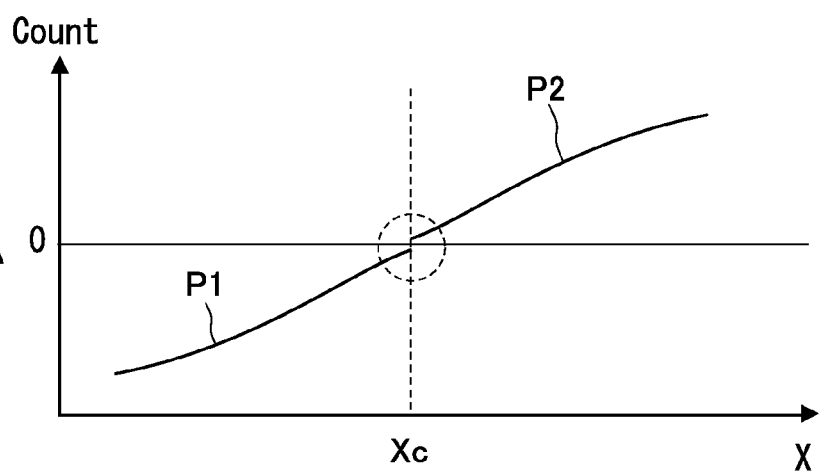
FIG. 17 are views for illustrating an action of a coordinate detection apparatus according to an embodiment of the present application.
Figure 17B:
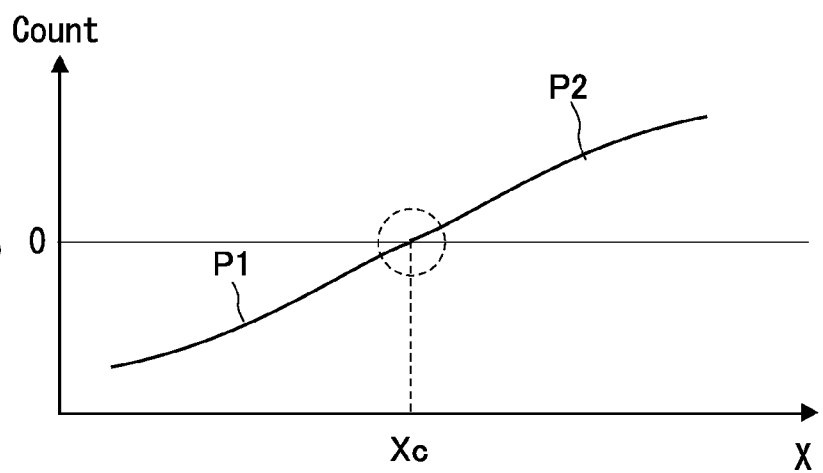

In addition, q and r are correction coefficients for suppressing deterioration of the linearity when an unnecessary count value becomes larger depending on the size of the detection target. For example, as shown in FIGS. 16A and 16B, as the area in which the electrode arrays and the finger F are opposed to each other becomes larger, the count value of ΣR unnecessary for calculation becomes larger. Meanwhile, if the values of the correction terms (−ΣR, +ΣL) inserted for deleting the count value unnecessary for calculation are large, a breakpoint appears in the Xc position as shown in FIG. 17A. In view of this, by substituting optimized correction coefficients q, r, it is possible to ensure a high linearity in the Xc position as shown in FIG. 17B.

Figure 18A:
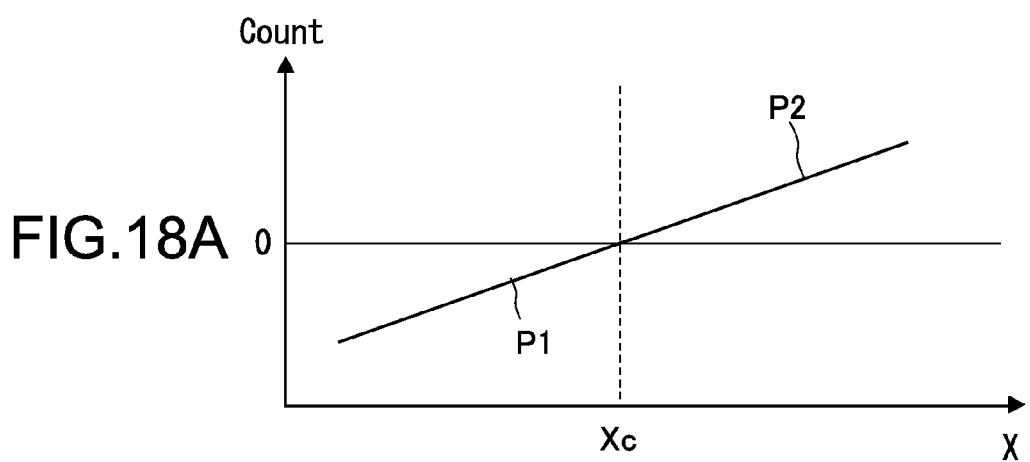
FIG. 18 are views for illustrating an action of a coordinate detection apparatus according to an embodiment of the present application.
Figure 18B:
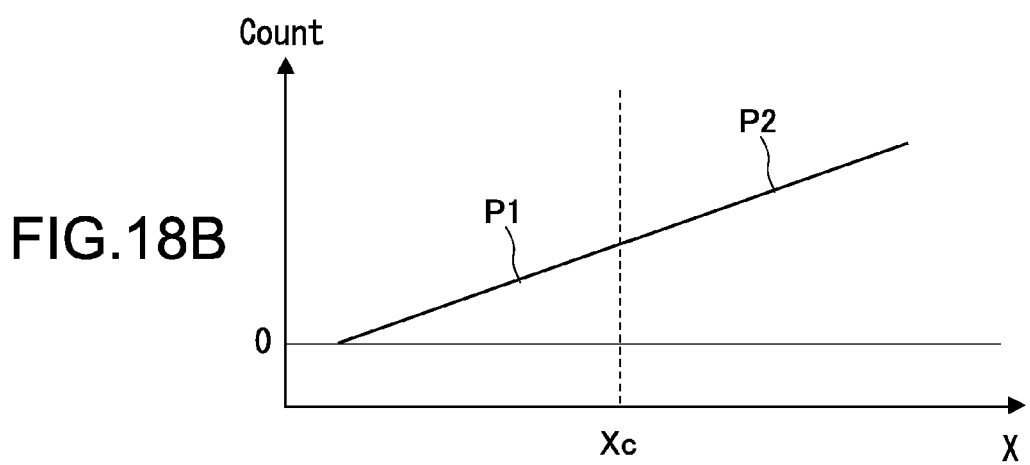

Further, s denotes a correction coefficient for dealing in positive values the calculated values of the capacitance ratios P1, P2. FIG. 18A shows the capacitance ratios P1, P2 before the correction, and FIG. 18B shows the capacitance ratios P1, P2 after the correction.

By the way, in each of the embodiments described above, by dividing the difference in capacitance value between the electrodes by the count value (ΣLCR or ΣLR) of all of the electrodes, variations in the capacitance ratio value depending on the size of the detection target is reduced. Such calculation is effective for not only the size of the detection target, but also reduction of variations in calculation due to temperature characteristics of the capacitance sensor 1, the drive section 18, the control section 19, and the like.

Figure 19:
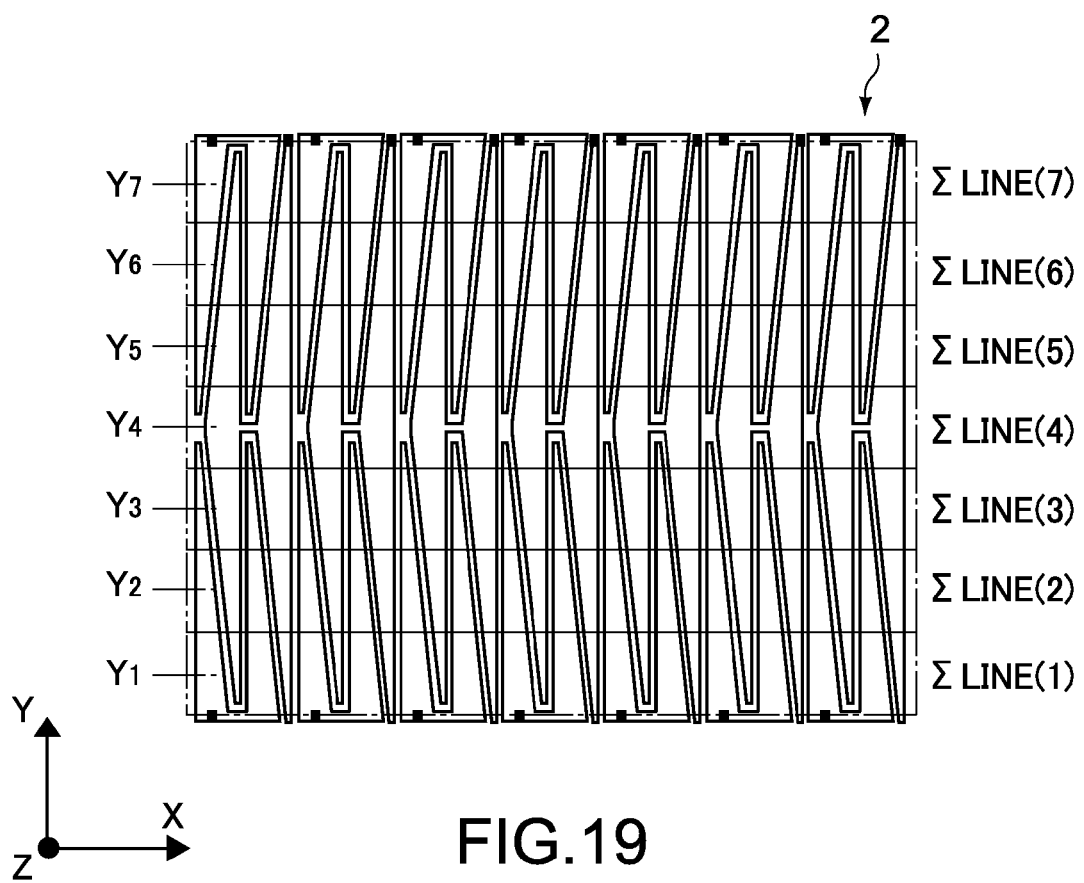
FIG. 19 is a view for illustrating a modified example of the coordinate detection apparatus according to the embodiment of the present application.

Further, in the above-mentioned embodiments, the X-axis direction is set to the longitudinal direction of the electrode arrays, and the Y-axis direction is set to the arrangement direction of the electrode arrays. However, as shown in FIG. 19, the X-axis direction may be set to the arrangement direction of the electrode arrays 20, and the Y-axis direction may be set to the longitudinal direction of the electrode arrays 20. FIG. 19 shows the configuration of the electrode arrays 20 shown in FIG. 13 as a configuration example of the electrode arrays.

In FIG. 19, a coordinate in a Y-direction can be determined by summing ΣLINE (n) (n is a line number)*center of gravity of line. Specifically, by using the following equation, a value corresponding to the coordinate in the Y-direction can be obtained.

$$Y = Y1 * \Sigma LINE(1) + Y2 * \Sigma LINE(2) + \ldots + Y7 * \Sigma LINE(7) \quad (10)$$

Further, it is also possible to correct a result of calculation of a coordinate in an X-direction in accordance with a result of the calculation of the Y-coordinate. For example, if a periodic coordinate offset in the Y-direction occurs, it is possible to correct the result of the calculation to a direction opposite to the periodic coordinate offset by using a value β calculated by the following calculation equation.

$$\beta = \alpha * \text{Sin}(2y/(a*\pi) + \pi/2) \quad (11)$$

Where β denotes a periodic correction value in the X-axis direction, y denotes a calculated coordinate value in the Y-axis direction, α denotes a maximum correction amount, and a denotes a pitch amount corresponding to a pitch in the Y-axis direction.

It should be noted that the present application can also be configured as follows.

(1) A coordinate detection apparatus, including:
  a plurality of electrode arrays each including
    a first electrode extending in a first direction and including
      a first region that is gradually larger in dimension, with respect to the first direction, in parallel with a second direction orthogonal to the first direction, and
      a second region that is gradually smaller in dimension, with respect to the first direction, in parallel with the second direction,
    a second electrode that extends in the first direction, is opposed to the first region in the second direction, and is gradually smaller in dimension, with respect to the first direction, in parallel with the second direction, and
    a third electrode that extends in the first direction, is opposed to the second region in the second direction, and is gradually larger in dimension, with respect to the first direction, in parallel with the second direction, the plurality of electrode arrays each including a group of the first electrode, the second electrode, and the third electrode that are arranged in the second direction and being configured to output a capacitance value corresponding to a distance between the electrode array and a detection target; and
  a processing unit configured to
    calculate
      a first value being a total sum of capacitance values of the first electrodes of the plurality of electrode arrays,
      a second value being a total sum of capacitance values of the second electrodes of the plurality of electrode arrays,
      a third value being a total sum of capacitance values of the third electrodes of the plurality of electrode arrays, and
      a fourth value being a sum of the first value, the second value, and the third value,
    detect, when the second value is larger than the third value, a first position coordinate in accordance with a first capacitance ratio being a ratio of a difference between the first value and the second value to the fourth value, and
    detect, when the second value is smaller than the third value, the first position coordinate in accordance with a second capacitance ratio being a ratio of a difference between the third value and the first value to the fourth value.

(2) The coordinate detection apparatus according to Item (1), in which the processing unit is further configured to
  detect, when a difference between the second value and the third value is larger than a first threshold, the first position coordinate in accordance with the first capacitance ratio,
  detect, when the difference between the second value and the third value is smaller than a second threshold smaller than the first threshold, the first position coordinate in accordance with the second capacitance ratio, and
  determine, when the difference between the second value and the third value is equal to or larger than the second threshold and is equal to or smaller than the first threshold, that the first position coordinate corresponds to a central part of the first electrode.

(3) The coordinate detection apparatus according to Item (1) or (2),
in which the processing unit is further configured to
calculate a fifth value being a sum of a capacitance value of the first electrode, a capacitance value of the second electrode, and a capacitance value of the third electrode for each of columns of the plurality of electrode arrays, and
detect, in accordance with the fifth value for each of the columns of the plurality of electrode arrays, a second position coordinate of the detection target along the second direction.

(4) The coordinate detection apparatus according to any one of Items (1) to (3),
in which the processing unit is further configured to add, so that the first capacitance ratio and the second capacitance ratio are equal to each other in a central part of the first electrode with respect to the first direction, an offset coefficient to at least one of the first capacitance ratio and the second capacitance ratio.

(5) The coordinate detection apparatus according to any one of Items (1) to (4),
in which the processing unit is further configured to multiply the fourth value by a correction coefficient for suppressing variation in the first capacitance ratio and the second capacitance ratio depending on an area in which the plurality of electrode arrays and the detection target are opposed to each other.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A coordinate detection apparatus, comprising:
a plurality of electrode arrays each including
a first electrode extending in a first direction and including
a first region that is gradually larger in dimension, with respect to the first direction, in parallel with a second direction orthogonal to the first direction, and
a second region that is gradually smaller in dimension, with respect to the first direction, in parallel with the second direction,
a second electrode that extends in the first direction, is opposed to the first region in the second direction, and is gradually smaller in dimension, with respect to the first direction, in parallel with the second direction, and
a third electrode that extends in the first direction, is opposed to the second region in the second direction, and is gradually larger in dimension, with respect to the first direction, in parallel with the second direction, the plurality of electrode arrays each including a group of the first electrode, the second electrode, and the third electrode that are arranged in the second direction and being configured to have a capacitance varied depending on proximity of a detection target; and
a processing unit configured to
calculate
a first value being a total sum of capacitance values of the first electrodes of the plurality of electrode arrays,
a second value being a total sum of capacitance values of the second electrodes of the plurality of electrode arrays,
a third value being a total sum of capacitance values of the third electrodes of the plurality of electrode arrays, and
a fourth value being a sum of the first value, the second value, and the third value,
detect, when the second value is larger than the third value, a first position coordinate in accordance with a first capacitance ratio being a ratio of a difference between the first value and the second value to the fourth value, and
detect, when the second value is smaller than the third value, the first position coordinate in accordance with a second capacitance ratio being a ratio of a difference between the third value and the first value to the fourth value.

2. The coordinate detection apparatus according to claim 1, wherein the processing unit is further configured to
detect, when a difference between the second value and the third value is larger than a first threshold, the first position coordinate in accordance with the first capacitance ratio,
detect, when the difference between the second value and the third value is smaller than a second threshold smaller than the first threshold, the first position coordinate in accordance with the second capacitance ratio, and
determine, when the difference between the second value and the third value is equal to or larger than the second threshold and is equal to or smaller than the first threshold, that the first position coordinate corresponds to a central part of the first electrode.

3. The coordinate detection apparatus according to claim 1, wherein the processing unit is further configured to
calculate a fifth value being a sum of a capacitance value of the first electrode, a capacitance value of the second electrode, and a capacitance value of the third electrode for each of columns of the plurality of electrode arrays, and
detect, in accordance with the fifth value for each of the columns of the plurality of electrode arrays, a second position coordinate of the detection target along the second direction.

4. The coordinate detection apparatus according to claim 1, wherein the processing unit is further configured to add, so that the first capacitance ratio and the second capacitance ratio are equal to each other in a central part of the first electrode with respect to the first direction, an offset coefficient to at least one of the first capacitance ratio and the second capacitance ratio.

5. The coordinate detection apparatus according to claim 1, wherein the processing unit is further configured to multiply the fourth value by a correction coefficient for suppressing variation in the first capacitance ratio and the second capacitance ratio depending on an area in which the plurality of electrode arrays and the detection target are opposed to each other.

6. A coordinate detection apparatus, comprising:
a plurality of electrode arrays each including
   a first electrode that extends in a first direction and is gradually larger in dimension, with respect to the first direction, in parallel with a second direction orthogonal to the first direction, and
   a second electrode that extends in the first direction, is opposed to the first electrode in the second direction, and is gradually smaller in dimension, with respect to the first direction, in parallel with the second direction, the plurality of electrode arrays each including a pair of the first electrode and the second electrode that are arranged in the second direction and being configured to have a capacitance varied depending on proximity of a detection target; and
a processing unit configured to
   calculate
      a first value being a total sum of capacitance values of the first electrodes of the plurality of electrode arrays,
      a second value being a total sum of capacitance values of the second electrodes of the plurality of electrode arrays, and
      a third value being a sum of the first value and the second value, and
   detect a first position coordinate of the detection target along the first direction in accordance with a ratio of a difference between the first value and the second value to the third value.

7. The coordinate detection apparatus according to claim 6, wherein the processing unit is further configured to
   calculate a fourth value being a sum of a capacitance value of the first electrode and a capacitance value of the second electrode for each of columns of the plurality of electrode arrays, and
   detect, in accordance with the fourth value for each of the columns of the plurality of electrode arrays, a second position coordinate of the detection target along the second direction.

8. A display apparatus, comprising:
a plurality of electrode arrays each including
   a first electrode extending in a first direction and including
      a first region that is gradually larger in dimension, with respect to the first direction, in parallel with a second direction orthogonal to the first direction, and
      a second region that is gradually smaller in dimension, with respect to the first direction, in parallel with the second direction,
   a second electrode that extends in the first direction, is opposed to the first region in the second direction, and is gradually smaller in dimension, with respect to the first direction, in parallel with the second direction, and
   a third electrode that extends in the first direction, is opposed to the second region in the second direction, and is gradually larger in dimension, with respect to the first direction, in parallel with the second direction, the plurality of electrode arrays each including a group of the first electrode, the second electrode, and the third electrode that are arranged in the second direction and being configured to have a capacitance varied depending on proximity of a detection target;
a display element including a display surface opposed to the plurality of electrode arrays; and
a processing unit configured to
   calculate
      a first value being a total sum of capacitance values of the first electrodes of the plurality of electrode arrays,
      a second value being a total sum of capacitance values of the second electrodes of the plurality of electrode arrays,
      a third value being a total sum of capacitance values of the third electrodes of the plurality of electrode arrays, and
         a fourth value being a sum of the first value, the second value, and the third value,
   detect, when the second value is larger than the third value, a first position coordinate in accordance with a first capacitance ratio being a ratio of a difference between the first value and the second value to the fourth value, and
   detect, when the second value is smaller than the third value, the first position coordinate in accordance with a second capacitance ratio being a ratio of a difference between the third value and the first value to the fourth value.

* * * * *